United States Patent
Zhamu et al.

(10) Patent No.: US 10,651,512 B2
(45) Date of Patent: May 12, 2020

(54) SHAPE-CONFORMABLE ALKALI METAL-SULFUR BATTERY HAVING A DEFORMABLE AND CONDUCTIVE QUASI-SOLID ELECTRODE

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 258 days.

(21) Appl. No.: 15/638,811

(22) Filed: Jun. 30, 2017

(65) Prior Publication Data

US 2019/0006719 A1    Jan. 3, 2019

(51) Int. Cl.
*H01M 10/39* (2006.01)
*H01M 4/38* (2006.01)
(Continued)

(52) U.S. Cl.
CPC ........ *H01M 10/3909* (2013.01); *H01G 11/36* (2013.01); *H01G 11/40* (2013.01); *H01M 4/13* (2013.01); *H01M 4/133* (2013.01); *H01M 4/136* (2013.01); *H01M 4/139* (2013.01); *H01M 4/1397* (2013.01); *H01M 4/38* (2013.01); *H01M 4/381* (2013.01); *H01M 4/48* (2013.01); *H01M 4/5815* (2013.01); *H01M 4/625* (2013.01); *H01M 10/052* (2013.01);
(Continued)

(58) Field of Classification Search
CPC .... H01M 4/0402; H01M 4/625; H01M 4/626; H01M 10/3954; H01M 2300/0002; H01M 2300/002; H01M 2300/0025; H01G 11/36; H01G 11/40

USPC ....................................................... 429/231.2
See application file for complete search history.

(56) References Cited

U.S. PATENT DOCUMENTS

| 7,759,008 B2 | 7/2010 | Barker et al. |
| 2005/0271574 A1 | 12/2005 | Jang et al. |

(Continued)

OTHER PUBLICATIONS

Ji et al., "A highly ordered nanostructured carbon-sulphur cathode for lithium-sulphur batteries" Nature Materials (2009) vol. 8, pp. 500-506.

(Continued)

*Primary Examiner* — Amanda C. Walke

(57) ABSTRACT

Provided is an alkali metal-sulfur cell comprising: (a) a quasi-solid cathode containing about 30% to about 95% by volume of a cathode active material (a sulfur-containing material), about 5% to about 40% by volume of a first electrolyte containing an alkali salt dissolved in a solvent (but no ion-conducting polymer dissolved therein), and about 0.01% to about 30% by volume of a conductive additive wherein the conductive additive, containing conductive filaments, forms a 3D network of electron-conducting pathways such that the quasi-solid electrode has an electrical conductivity from about $10^{-6}$ S/cm to about 300 S/cm; (b) an anode; and (c) an ion-conducting membrane or porous separator disposed between the anode and the quasi-solid cathode; wherein the quasi-solid cathode has a thickness from 200 μm to 100 cm and a cathode active material having an active material mass loading greater than 10 mg/cm$^2$.

25 Claims, 11 Drawing Sheets

(51) Int. Cl.
*H01M 4/48* (2010.01)
*H01M 4/136* (2010.01)
*H01M 4/133* (2010.01)
*H01M 10/36* (2010.01)
*H01M 4/1397* (2010.01)
*H01M 4/139* (2010.01)
*H01M 10/0564* (2010.01)
*H01M 10/054* (2010.01)
*H01M 4/13* (2010.01)
*H01M 10/052* (2010.01)
*H01M 4/58* (2010.01)
*H01M 4/62* (2006.01)
*H01G 11/36* (2013.01)
*H01G 11/40* (2013.01)
*H01M 10/056* (2010.01)

(52) U.S. Cl.
CPC ..... *H01M 10/054* (2013.01); *H01M 10/0564* (2013.01); *H01M 10/36* (2013.01); *H01M 10/056* (2013.01); *H01M 2300/0002* (2013.01); *H01M 2300/0045* (2013.01); *H01M 2300/0085* (2013.01)

(56) References Cited

U.S. PATENT DOCUMENTS

| | | |
|---|---|---|
| 2012/0088154 A1 | 4/2012 | Liu et al. |
| 2013/0171339 A1 | 7/2013 | Wang et al. |
| 2013/0337319 A1* | 12/2013 | Doherty ............... H01M 4/0411 429/209 |
| 2014/0170524 A1* | 6/2014 | Chiang ................. H01M 8/188 429/482 |
| 2014/0193721 A1 | 7/2014 | Suto |
| 2014/0234702 A1 | 8/2014 | Zhang et al. |
| 2015/0024121 A1 | 1/2015 | He et al. |
| 2017/0077546 A1* | 3/2017 | Zhamu ................ H01M 10/054 |
| 2019/0006721 A1* | 1/2019 | Zhamu ............. H01M 10/3954 |

OTHER PUBLICATIONS

PCT/US18/22141 International Search Report and Written Opinion dated May 21, 2018, 14 pages.

PCT/US18/31528 International Search Report and Written Opinion dated Aug. 30, 2018, 9 pages.

* cited by examiner

SHAPE-CONFORMABLE ALKALI METAL-SULFUR BATTERY HAVING A DEFORMABLE AND CONDUCTIVE QUASI-SOLID ELECTRODE

FIELD OF THE INVENTION

The present invention relates generally to the field of alkali metal-sulfur batteries, including rechargeable lithium metal-sulfur batteries, sodium metal-sulfur batteries, lithium-ion sulfur batteries, and sodium-ion sulfur batteries.

BACKGROUND OF THE INVENTION

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-250 Wh/kg, most typically 150-220 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li^\circ$. This electrochemical potential is approximately ⅔ of that exhibited by conventional positive electrodes (e.g. $LiMnO_4$) in a conventional lithium-ion battery. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/L, respectively, based on the combined Li and S weight or volume. If based on the total cell weight or volume, the energy densities can reach approximately 1,000 Wh/kg and 1,100 Wh/L, respectively. However, the current Li-sulfur cells reported by industry leaders in sulfur cathode technology have a maximum cell specific energy of 250-400 Wh/kg and 500-650 Wh/L (based on the total cell weight or volume), which are far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.
(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.
(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.
(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications.

For instance, Ji, et al reported that cathodes based on nanostructured sulfur/meso-porous carbon materials could overcome these challenges to a large degree, and exhibit stable, high, reversible capacities with good rate properties and cycling efficiency [Xiulei Ji, Kyu Tae Lee, & Linda F. Nazar, "A highly ordered nanostructured carbon-sulphur cathode for lithium-sulphur batteries," *Nature Materials* 8, 500-506 (2009)]. However, the fabrication of the proposed highly ordered meso-porous carbon structure requires a tedious and expensive template-assisted process. It is also challenging to load a large proportion of sulfur into these meso-scaled pores using a physical vapor deposition or solution precipitation process.

Zhang, et al. (US Pub. No. 2014/0234702; Aug. 21, 2014) makes use of a chemical reaction method of depositing S particles on surfaces of isolated graphene oxide (GO) sheets. But, this method is incapable of creating a large proportion of S particles on GO surfaces (i.e. typically <66% of S in the GO-S nanocomposite composition). The resulting Li—S cells also exhibit poor rate capability; e.g. the specific capacity of 1,100 mAh/g (based on S weight) at 0.02 C rate is reduced to <450 mAh/g at 1.0 C rate. It may be noted that the highest achievable specific capacity of 1,100 mAh/g represents a sulfur utilization efficiency of only 1,100/1,675=65.7% even at such a low charge/discharge rate (0.02 C means completing the charge or discharge process in 1/0.02=50 hours; 1 C=1 hour, 2 C=½ hours, and 3 C=⅓ hours, etc.) Further, such a S-GO nanocomposite cathode-based Li—S cell exhibits very poor cycle life, with the capacity typically dropping to less than 60% of its original capacity in less than 40 charge/discharge cycles. Such a short cycle life makes this Li—S cell not useful for any practical application. Another chemical reaction method of depositing S particles on graphene oxide surfaces is disclosed by Wang, et al. (US Pub. No. 2013/0171339; Jul. 4, 2013). This Li—S cell still suffers from the same problems.

A solution precipitation method was disclosed by Liu, et al. (US Pub. No. 2012/0088154; Apr. 12, 2012) to prepare graphene-sulfur nanocomposites (having sulfur particles adsorbed on GO surfaces) for use as the cathode material in a Li—S cell. The method entails mixing GO sheets and S in a solvent ($CS_2$) to form a suspension. The solvent is then evaporated to yield a solid nanocomposite, which is then ground to yield nanocomposite powder having primary sulfur particles with an average diameter less than approximately 50 nm. Unfortunately, this method does not appear to be capable of producing S particles less than 40 nm. The resulting Li—S cell exhibits very poor cycle life (a 50% decay in capacity after only 50 cycles). Even when these nanocomposite particles are encapsulated in a polymer, the Li—S cell retains less than 80% of its original capacity after 100 cycles. The cell also exhibits a poor rate capability (specific capacity of 1,050 mAh/g(S wt.) at 0.1 C rate, dropped to <580 mAh/g at 1.0 C rate). Again, this implies that a large proportion of S did not contribute to the lithium storage, resulting in a low S utilization efficiency.

Despite the various approaches proposed for the fabrication of high energy density Li—S cells, there remains a need for cathode materials and production processes that improve the utilization of electro-active cathode materials (S utilization efficiency), and provide rechargeable Li—S cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, and (iii) low Coulombic efficiency. Again, these drawbacks arise mainly from insulating nature of S, dissolution of S and Na or K polysulfide intermediates in liquid electrolytes (and related Shuttle effect), and large volume change during charge/discharge.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

Low-capacity anode or cathode active materials are not the only problem associated with the lithium-sulfur or sodium-sulfur battery. There are serious design and manufacturing issues that the battery industry does not seem to be aware of, or has largely ignored. For instance, despite the seemingly high gravimetric capacities at the electrode level (based on the anode or cathode active material weight alone) as frequently claimed in open literature and patent documents, these electrodes unfortunately fail to provide batteries with high capacities at the battery cell or pack level (based on the total battery cell weight or pack weight). This is due to the notion that, in these reports, the actual active material mass loadings of the electrodes are too low. In most cases, the active material mass loadings of the anode (areal density) is significantly lower than 15 mg/cm$^2$ and mostly <8 mg/cm$^2$ (areal density=the amount of active materials per electrode cross-sectional area along the electrode thickness direction). The cathode active material amount is typically 1.5-2.5 times higher than the anode active material amount in a cell. As a result, the weight proportion of the anode active material (e.g. carbon) in a Na ion-sulfur or Li ion-sulfur battery cell is typically from 15% to 20%, and that of the cathode active material from 20% to 35% (mostly <30%). The weight fraction of the cathode and anode active materials combined is typically from 35% to 50% of the cell weight.

The low active material mass loading is primarily due to the inability to obtain thicker electrodes (thicker than 100-

200 µm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. Due to the low-melting and soft characteristics of sulfur, it has been practically impossible to produce a sulfur cathode thicker than 100 µm. Furthermore, in a real battery manufacturing facility, a coated electrode thicker than 150 µm would require a heating zone as long as 100 meters to thoroughly dry the coated slurry. This would significantly increase the equipment cost and reduce the production throughput. The low areal densities and low volume densities (related to thin electrodes and poor packing density) result in a relatively low volumetric capacity and low volumetric energy density of the battery cells.

With the growing demand for more compact and portable energy storage systems, there is keen interest to increase the utilization of the volume of the batteries. Novel electrode materials and designs that enable high volumetric capacities and high mass loadings are essential to achieving improved cell volumetric capacities and energy densities.

Thus, an object of the present invention is to provide a rechargeable alkali metal-sulfur cell based on rational materials and battery designs that overcome or significantly reduce the following issues commonly associated with conventional Li—S and Na—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides); (c) dissolution of S and alkali metal polysulfide in electrolyte and migration of polysulfides from the cathode to the anode (which irreversibly react with Li or Na metal at the anode), resulting in active material loss and capacity decay (the shuttle effect); (d) short cycle life; and (e) low active mass loading in both the anode and the cathode.

A specific object of the present invention is to provide a rechargeable alkali metal-sulfur battery (e.g. mainly Li—S and room temperature Na—S battery) that exhibits an exceptionally high specific energy or high energy density. One particular technical goal of the present invention is to provide an alkali metal-sulfur or alkali ion-sulfur cell with a cell specific energy greater than 400 Wh/Kg, preferably greater than 500 Wh/Kg, more preferably greater than 600 Wh/Kg, and most preferably greater than 700 Wh/kg (all based on the total cell weight). Preferably, the volumetric energy density is greater than 600 Wh/L, further preferably greater than 800 Wh/L, and most preferably greater than 1,000 Wh/L.

Another object of the present invention is to provide an alkali metal-sulfur cell that exhibits a high cathode specific capacity, higher than 1,200 mAh/g based on the sulfur weight, or higher than 1,000 mAh/g based on the cathode composite weight (including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

With electronic devices becoming more compact and electric vehicles (EV) becoming of lighter weight, there is a pressing need for a high-energy density battery that is shape-conformable so that it can be fitted into some odd-shape or confined spaces in a device or vehicle. By implementing a battery in a space that otherwise would be an empty (unused or "wasted") space (e.g. part of a car door or roof top), one can make the device more compact or make the EV capable of storing more power. In order to make the battery shape-conformable, the electrodes must be deformable, flexible, and shape-conformable.

Therefore, there is clear and urgent need for lithium and sodium batteries that have high active material mass loading (high areal density), high electrode thickness or volume without compromising conductivity, high-rate capability, high power density, and high energy density. These batteries must be produced in an environmentally benign manner. Further, the battery must be shape-conformable.

SUMMARY OF THE INVENTION

The present invention provides a method of producing a lithium-sulfur battery, sodium-sulfur battery, or potassium-sulfur battery having a high active material mass loading, exceptionally low overhead weight and volume (relative to the active material mass and volume), high capacity, and unprecedentedly high energy density and power density. This Li—S, Na—S, or K—S battery can be a primary battery (non-rechargeable) or a secondary battery (rechargeable), including a rechargeable lithium metal-sulfur or sodium metal-sulfur battery (having a lithium or sodium metal anode) and a lithium-ion sulfur or sodium-ion sulfur battery (e.g. having a first lithium intercalation compound as an anode active material). The battery also includes the potassium-sulfur battery.

In certain embodiments, the invention provides an alkali-sulfur cell comprising: (a) a quasi-solid cathode containing about 30% to about 95% by volume of a sulfur-containing cathode active material (preferably selected from sulfur, a metal-sulfur compound, a sulfur-carbon composite, a sulfur-graphene composite, a sulfur-graphite composite, an organic sulfur compound, a sulfur-polymer composite, or a combination thereof), about 5% to about 40% by volume of a first electrolyte containing an alkali salt dissolved in a solvent (but containing no ion-conducting polymer dissolved in, dispersed in, or impregnated by this solvent), and about 0.01% to about 30% by volume of a conductive additive wherein the conductive additive, containing conductive filaments, forms a 3D network of electron-conducting pathways such that the quasi-solid electrode has an electrical conductivity from about $10^{-6}$ S/cm to about 300 S/cm; (b) an anode; and (c) an ion-conducting membrane or porous separator disposed between the anode and the quasi-solid cathode; wherein said quasi-solid cathode has a thickness no less than 200 µm. The quasi-solid cathode preferably contains a cathode active material mass loading no less than 10 mg/cm$^2$, preferably no less than 15 mg/cm$^2$, further preferably no less than 25 mg/cm$^2$, more preferably no less than 35 mg/cm$^2$, still more preferably no less than 45 mg/cm$^2$, and most preferably greater than 65 mg/cm$^2$.

In this cell, the anode may contain a quasi-solid anode containing about 1.0% to about 95% by volume of an anode active material, about 5% to about 40% by volume of a second electrolyte containing an alkali salt dissolved in a solvent (containing some or no ion-conducting polymer dissolved in, dispersed in, or impregnated by this solvent), and about 0.01% to about 30% by volume of a conductive additive wherein said conductive additive, containing conductive filaments, forms a 3D network of electron-conducting pathways such that the quasi-solid electrode has an electrical conductivity from about $10^{-6}$ S/cm to about 300 S/cm; wherein said quasi-solid anode has a thickness no less than 200 μm. The quasi-solid anode preferably contains an anode active material mass loading no less than 10 mg/cm², preferably no less than 15 mg/cm², further preferably no less than 25 mg/cm², more preferably no less than 35 mg/cm², still more preferably no less than 45 mg/cm², and most preferably greater than 65 mg/cm². The first electrolyte may be the same as or different from the second electrolyte in composition and structure.

In certain embodiments, the invention provides an alkali-sulfur cell comprising: (A) a quasi-solid anode containing about 1.0% to about 95% by volume of an anode active material, about 5% to about 40% by volume of an electrolyte containing an alkali salt dissolved in a solvent (containing no ion-conducting polymer dissolved in, dispersed in, or impregnated by this solvent), and about 0.01% to about 30% by volume of a conductive additive wherein the conductive additive, containing conductive filaments, forms a 3D network of electron-conducting pathways such that the quasi-solid electrode has an electrical conductivity from about $10^{-6}$ S/cm to about 300 S/cm; (B) a cathode containing a sulfur-containing cathode active material selected from sulfur, a metal-sulfur compound, a sulfur-carbon composite, a sulfur-graphene composite, a sulfur-graphite composite, an organic sulfur compound, a sulfur-polymer composite, or a combination thereof; and (C) an ion-conducting membrane or porous separator disposed between the quasi-solid anode and the cathode; wherein said quasi-solid anode and the cathode preferably each has a thickness no less than 200 μm.

The presently invented quasi-solid electrodes are deformable, flexible, and shape-conformable, enabling a shape-conformable battery.

The present invention also provides a method of preparing an alkali-sulfur cell having a quasi-solid electrode, the method comprising: (a) combining a quantity of an active material (an anode active material or a cathode active material), a quantity of an electrolyte containing an alkali salt dissolved in a solvent, and a conductive additive to form a deformable and electrically conductive electrode material, wherein the conductive additive, containing conductive filaments, forms a 3D network of electron-conducting pathways; (b) forming the electrode material into a quasi-solid electrode (the first electrode), wherein the forming step includes deforming the electrode material into an electrode shape without interrupting the 3D network of electron-conducting pathways such that the electrode maintains an electrical conductivity no less than $10^{-6}$ S/cm (preferably no less than $10^{-5}$ S/cm, more preferably no less than $10^{-3}$ S/cm, further preferably no less than $10^{-2}$ S/cm, still more preferably and typically no less than $10^{-1}$ S/cm, even more typically and preferably no less than 1 S/cm, and further more typically and preferably no less than 10 S/cm and up to 300 S/cm); (c) forming a second electrode (the second electrode may be a quasi-solid electrode as well); and (d) forming an alkali-sulfur cell by combining the quasi-solid electrode and the second electrode having an ion-conducting separator disposed between the two electrodes.

A "filament" is a solid material object having a largest dimension (e.g. length) and a smallest dimension (e.g. diameter or thickness) and the largest dimension-to-smallest dimension ratio is greater than 3, preferably greater than 10, and further preferably greater than 100. Typically, this is a wire-like, fiber-like, needle-like, rod-like, platelet-like, sheet-like, ribbon-like, or disc-like object, just to name a few. In certain embodiments, the conductive filaments are selected from carbon fibers, graphite fibers, carbon nanofibers, graphite nanofibers, carbon nanotubes, needle coke, carbon whiskers, conductive polymer fibers, conductive material-coated fibers, metal nanowires, metal fibers, metal wires, graphene sheets, expanded graphite platelets, a combination thereof, or a combination thereof with non-filamentary conductive particles.

In certain embodiments, the electrode maintains an electrical conductivity from $10^{-5}$ S/cm to about 100 S/cm.

In certain embodiments, the deformable electrode material has an apparent viscosity of no less than about 10,000 Pa-s measured at an apparent shear rate of 1,000 s$^{-1}$. In certain embodiments, the deformable electrode material has an apparent viscosity of no less than about 100,000 Pa-s at an apparent shear rate of 1,000 s$^{-1}$.

In the method, the quantity of the active material is typically from about 20% to about 95% by volume of the electrode material, more typically from about 35% to about 85% by volume of the electrode material, and most typically from about 50% to about 75% by volume of the electrode material.

Preferably, the step of combining active material, conductive additive, and electrolyte (including dissolving a lithium or sodium salt in a liquid solvent) follows a specific sequence. This step includes first dispersing the conductive filaments into a liquid solvent to form a homogeneous suspension, followed by adding the active material in the suspension and by dissolving a lithium salt or sodium salt in the liquid solvent. In other words, the conductive filaments must be uniformly dispersed in the liquid solvent first prior to adding other ingredients, such as active material, and prior to dissolving the lithium salt or sodium salt in the solvent. This sequence is essential to achieving percolation of conducting filaments for forming a 3D network of electron-conducting pathways at a lower conductive filament volume fraction (lower threshold volume fraction). Without following such a sequence, the percolation of conducting filaments may not occur or occur only when an excessively large proportion of conducting filaments (e.g. >10% by volume) is added, which would reduce the fraction of active material and thus reduce the energy density of the cell.

In certain embodiments, the steps of combining and forming the electrode material into a quasi-solid electrode include dissolving a lithium salt (or sodium salt) in a liquid solvent to form an electrolyte having a first salt concentration and subsequently removing portion of the liquid solvent to increase the salt concentration to obtain a quasi-solid electrolyte having a second salt concentration, which is higher than the first concentration and preferably higher than 2.5 M of salt (and more preferably from 3.0 M to 14 M). The resulting electrolyte is in a saturated or supersaturated state without precipitation or crystallization of the salt from the electrolyte.

The step of removing portion of solvent may be conducted in such a manner that it does not cause precipitation or crystallization of the salt and that the electrolyte is in a saturated or supersaturated state. In certain preferred embodiments, the liquid solvent contains a mixture of at least a first liquid solvent and a second liquid solvent and the first liquid solvent is more volatile than the second liquid solvent, wherein the step of removing portion of the liquid solvent includes partially or fully removing the first liquid solvent. The resulting electrolyte is in a saturated or supersaturated state without precipitation or crystallization of the salt from the electrolyte.

There is no restriction on the types of anode active materials that can be used in practicing the instant invention.

In certain preferred embodiments, the alkali metal cell is a lithium metal battery, lithium-ion battery, or lithium-ion capacitor, wherein the anode active material is selected from the group consisting of: (a) Particles of lithium metal or a lithium metal alloy; (b) Natural graphite particles, artificial graphite particles, meso-carbon microbeads (MCMB), carbon particles (including soft carbon and hard carbon), needle coke, carbon nanotubes, carbon nanofibers, carbon fibers, and graphite fibers; (c) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (d) Alloys or intermetallic compounds of Si, Ge, Sn, Pb, Sb, Bi, Zn, Al, or Cd with other elements, wherein said alloys or compounds are stoichiometric or non-stoichiometric; (e) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; (f) Pre-lithiated versions thereof; (g) Pre-lithiated graphene sheets; and combinations thereof.

In certain embodiments, the alkali metal cell is a sodium metal-sulfur cell or sodium-ion sulfur cell and the active material is an anode active material containing a sodium intercalation compound selected from petroleum coke, amorphous carbon, activated carbon, hard carbon (carbon that is difficult to graphitize), soft carbon (carbon that can be readily graphitized), templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In certain embodiments, the alkali metal cell is a sodium metal-sulfur cell or sodium-ion sulfur cell and the active material is an anode active material selected from the group consisting of: (a) Particles of sodium metal or a sodium metal alloy; (b) Natural graphite particles, artificial graphite particles, meso-carbon microbeads (MCMB), carbon particles, needle coke, carbon nanotubes, carbon nanofibers, carbon fibers, and graphite fibers; (c) Sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (d) Sodium-containing alloys or intermetallic compounds of Si, Ge, Sn, Pb, Sb, Bi, Zn, Al, Ti, Co, Ni, Mn, Cd, and their mixtures; (e) Sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (f) Sodium salts; and (g) Graphene sheets pre-loaded with sodium ions; and combinations thereof.

The electrolytes can contain water, organic liquid, ionic liquid (ionic salt having a melting temperature lower than 100° C., preferably lower than room temperature, 25° C.), or a mixture of an ionic liquid and an organic liquid at a ratio from 1/100 to 100/1. The organic liquid is desirable, but the ionic liquid is preferred. The electrolyte typically and preferably contains a high solute concentration (concentration of lithium/sodium salt) that brings the solute to a saturated or supersaturated state in the resulting electrode (anode or cathode). Such an electrolyte is essentially a quasi-solid electrolyte that behaves like a deformable or conformable solid. This new class of electrolyte is fundamentally distinct from a liquid electrolyte, polymer gel electrolyte, or solid-state electrolyte.

In a preferred embodiment, the quasi-solid electrode has a thickness from 200 μm to 1 cm, preferably from 300 μm to 0.5 cm (5 mm), further preferably from 400 μm to 3 mm, and most preferably from 500 μm to 2.5 mm (2,500 μm). If the active material is an anode active material, the anode active material has a mass loading no less than 25 mg/cm$^2$ (preferably no less than 30 mg/cm$^2$, and more preferably no less than 35 mg/cm$^2$) and/or occupies at least 25% (preferably at least 30% and more preferably at least 35%) by weight or by volume of the entire battery cell. If the active material is a cathode active material, the cathode active material preferably has a mass loading no less than 20 mg/cm$^2$ (preferably no less than 25 mg/cm$^2$ and more preferably no less than 30 mg/cm$^2$, most preferably no less than 40 mg/cm$^2$) in the cathode and/or occupies at least 45% (preferably at least 50% and more preferably at least 55%) by weight or by volume of the entire battery cell.

The aforementioned requirements on electrode thickness, the anode active material areal mass loading or mass fraction relative to the entire battery cell, or the cathode active material areal mass loading or mass fraction relative to the entire battery cell have not been possible with conventional lithium or sodium batteries using the conventional slurry coating and drying process.

In some embodiments, the anode active material is a pre-lithiated version of graphene sheets selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof. Surprisingly, without pre-lithiation, the resulting lithium battery cell does not exhibit a satisfactory cycle life (i.e. capacity decays rapidly).

In the lithium metal battery, the cathode active material constitutes an electrode active material loading greater than 15 mg/cm$^2$ (preferably greater than 25 mg/cm$^2$, more preferably greater than 35 mg/cm$^2$, and most preferably greater than 50 mg/cm$^2$) and/or wherein the electrode has a thickness no less than 300 μm (preferably no less than 400 μm, more preferably no less than 500 μm, can be up to or greater than 100 cm). There is no theoretical limit on the electrode thickness of the presently invented alkali metal battery.

DESCRIPTION OF THE PREFERRED EMBODIMENTS

This invention is directed at a lithium-sulfur battery or sodium-sulfur battery exhibiting an exceptionally high energy density that has never been previously achieved. This battery can be a primary battery, but is preferably a secondary battery selected from a lithium-ion sulfur battery, a lithium metal-sulfur secondary battery (e.g. using lithium metal as an anode active material), a sodium-ion sulfur battery, or a sodium metal-sulfur battery (e.g. using sodium metal as an anode active material and carbon-supported sulfur as a cathode active material). The battery is based on a quasi-solid electrolyte, which contains a lithium or sodium salt dissolved in water, an organic solvent, an ionic liquid, or a mixture of organic and ionic liquid. Preferably the electrolyte is a "quasi-solid electrolyte" containing a high concentration of solutes (a lithium salt or sodium salt) in a solvent to the extent that it behaves like a solid, but remains deformable even when desirable amounts of conductive filaments and an active material are added into the electrolyte (hence, the term "deformable quasi-solid electrode"). The electrolyte is not a liquid electrolyte, nor a solid electrolyte. The shape of a lithium battery can be cylindrical, square, button-like, etc. and can be an odd shape or irregular shape. The present invention is not limited to any battery shape or configuration.

Figure 1A:
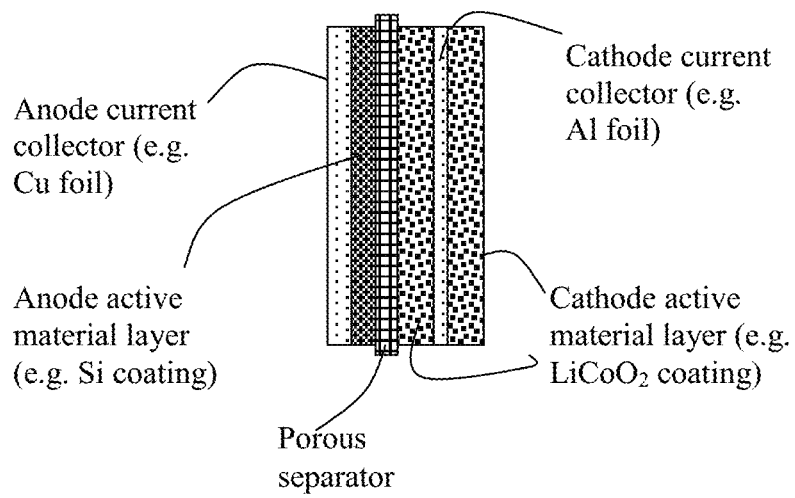
FIG. 1(A) Schematic of a prior art lithium-ion battery cell composed of an anode current collector, one or two anode active material layers (e.g. thin Si coating layers) coated on the two primary surfaces of the anode current collector, a porous separator and electrolyte, one or two cathode electrode layers (e.g. sulfur layers), and a cathode current collector.

As illustrated in FIG. 1(A), a prior art lithium or sodium battery cell, including Li—S or room temperature Na—S cell, is typically composed of an anode current collector (e.g. Cu foil), an anode electrode or anode active material layer (e.g. Li metal foil, sodium foil, or prelithiated Si coating deposited on one or two sides of a Cu foil), a porous separator and/or an electrolyte component, a cathode electrode or cathode active material layer (or two cathode active material layers coated on two sides of an Al foil), and a cathode current collector (e.g. Al foil).

Figure 1B:
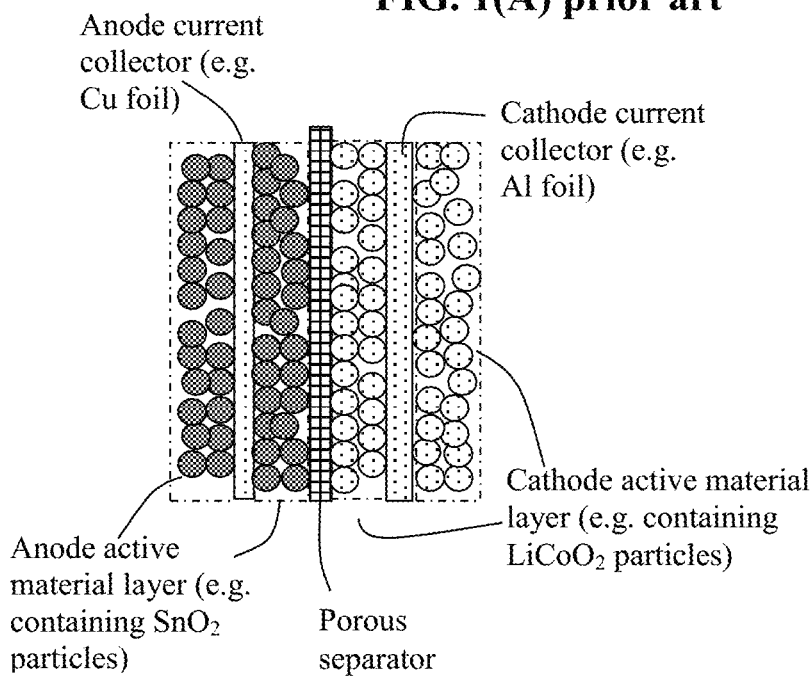
FIG. 1(B) Schematic of a prior art lithium-ion battery, wherein the electrode layer is composed of discrete particles of an active material (e.g. graphite or tin oxide particles in the anode layer or sulfur/carbon in the cathode layer), conductive additives (not shown), and resin binder (not shown).

In a more commonly used prior art cell configuration (FIG. 1(B)), the anode layer is composed of particles of an anode active material (e.g. graphite, hard carbon, or Si), a conductive additive (e.g. carbon black particles), and a resin binder (e.g. SBR or PVDF). The cathode layer is composed of particles of a cathode active material (e.g. LFP particles in a Li-ion cell and lithium polysulfide/carbon composite particles in a Li—S cell), a conductive additive (e.g. carbon black particles), and a resin binder (e.g. PVDF). Both the anode and the cathode layers are typically up to 100-200 μm thick to give rise to a presumably sufficient amount of current per unit electrode area. This thickness range is considered an industry-accepted constraint under which a battery designer normally works under. This thickness constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <100 μm) does not contain a sufficient amount of an active lithium storage material (hence, insufficient current output); (c) thicker electrodes are prone to delaminate or crack upon drying or handling after roll-coating; and (d) all non-active material layers in a battery cell (e.g. current collectors and separator) must be kept to a minimum in order to obtain a minimum overhead weight and a maximum lithium storage capability and, hence, a maximized energy density (Wk/kg or Wh/L of cell).

In a less commonly used cell configuration, as illustrated in FIG. 1(A), either the anode active material (e.g. Si coating) or the cathode active material is deposited in a thin film form directly onto a current collector, such as a sheet of copper foil or Al foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking (for the anode) or to facilitate a full utilization of the cathode active material. Such a constraint further diminishes the total lithium storage capacity and the lithium storage capacity per unit electrode surface area. Such a thin-film battery has very limited scope of application.

On the anode side, a Si layer thicker than 100 nm has been found to exhibit poor cracking resistance during battery charge/discharge cycles. It takes but a few cycles for the Si layer to get fragmented. On the cathode side, a sputtered layer of lithium metal oxide thicker than 100 nm does not allow lithium ions to fully penetrate and reach full body of the cathode layer, resulting in a poor cathode active material utilization rate. A desirable electrode thickness is at least 100 μm, with individual active material coating or particle having a dimension desirably less than 100 nm. Thus, these thin-film electrodes (with a thickness <100 nm) directly deposited on a current collector fall short of the required thickness by three (3) orders of magnitude. As a further problem, all of the cathode active materials are not conductive to both electrons and lithium ions. A large layer thickness implies an excessively high internal resistance and a poor active material utilization rate. Sodium batteries have similar issues.

In other words, there are several conflicting factors that must be considered concurrently when it comes to the design and selection of a cathode or anode active material in terms of material type, size, electrode layer thickness, and active material mass loading. Thus far, there has been no effective solution offered by any prior art teaching to these often conflicting problems. We have solved these challenging issues, which have troubled battery designers and electrochemists alike for more than 30 years, by developing a new method of producing lithium batteries or sodium batteries as herein disclosed.

The prior art lithium battery cell is typically made by a process that includes the following steps: (a) The first step is mixing particles of the anode active material (e.g. Si nano particles or meso-carbon micro-beads, MCMBs), a conductive filler (e.g. graphite flakes), a resin binder (e.g. PVDF) in a solvent (e.g. NMP) to form an anode slurry. On a separate basis, particles of the cathode active material (e.g. LFP particles), a conductive filler (e.g. acetylene black), a resin binder (e.g. PVDF) are mixed and dispersed in a solvent (e.g. NMP) to form a cathode slurry. (b) The second step includes coating the anode slurry onto one or both primary surfaces of an anode current collector (e.g. Cu foil), drying the coated layer by vaporizing the solvent (e.g. NMP) to form a dried anode electrode coated on Cu foil. Similarly, the cathode slurry is coated and dried to form a dried cathode electrode coated on Al foil. Slurry coating is normally done in a roll-to-roll manner in a real manufacturing situation; (c) The third step includes laminating an anode/Cu foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure. (d) The rectangular or cylindrical laminated structure is then encased in an aluminum-plastic laminated envelope or steel casing. (e) A liquid electrolyte is then injected into the laminated structure to make a lithium battery cell.

There are several serious problems associated with the process and the resulting lithium battery cell:

1) It is very difficult to produce an electrode layer (anode layer or cathode layer) that is thicker than 200 μm. There are several reasons why this is the case. An electrode of 100-200 μm thickness typically requires a heating zone of 30-50 meters long in a slurry coating facility, which is too time consuming, too energy intensive, and not cost-effective. For some electrode active materials, such as metal oxide particles, it has not been possible to produce an electrode of good structural integrity that is thicker than 100 μm in a real manufacturing environment on a continuous basis. The resulting electrodes are very fragile and brittle. Thicker electrodes have a high tendency to delaminate and crack.

2) With a conventional process, as depicted in FIG. 1(A), the actual mass loadings of the electrodes and the apparent densities for the active materials are too low to achieve a gravimetric energy density of >200 Wh/kg. In most cases, the anode active material mass loading of the electrodes (areal density) is significantly lower than 25 mg/cm$^2$ and the apparent volume density or tap density of the active material is typically less than 1.2 g/cm$^3$ even for relatively large particles of graphite. The cathode active material mass loading of the electrodes (areal density) is significantly lower than 45 mg/cm$^2$ for lithium metal oxide-type inorganic materials and lower than 15 mg/cm$^2$ for organic or polymer materials. In addition, there are so many other non-active materials (e.g. conductive additive and resin binder) that add additional weights and volumes to the electrode without contributing to the cell capacity. These low areal densities and low volume densities result in relatively low gravimetric energy density and low volumetric energy density.

3) The conventional process requires dispersing electrode active materials (anode active material and cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a battery cell, one then injects a liquid electrolyte into the cell. In actuality, one makes the two electrodes wet, then makes the electrodes dry, and finally makes them wet again. Such a dry-wet-dry-wet process is not a good process at all.

4) Current lithium-ion batteries still suffer from a relatively low gravimetric energy density and low volumetric energy density. Commercially available lithium-ion batteries exhibit a gravimetric energy density of approximately 150-220 Wh/kg and a volumetric energy density of 450-600 Wh/L.

In literature, the energy density data reported based on either the active material weight alone or the electrode weight cannot directly translate into the energy densities of a practical battery cell or device. The "overhead weight" or weights of other device components (binder, conductive additive, current collectors, separator, electrolyte, and packaging) must also be taken into account. The convention production process results in the weight proportion of the anode active material (e.g. graphite or carbon) in a lithium-ion battery being typically from 12% to 17%, and that of the cathode active material from 20% to 35% (for inorganic such as LiMn$_2$O$_4$) or from 7-15% (for organic or polymer cathode materials).

The present invention provides a lithium-sulfur battery or room temperature sodium-sulfur battery cell having a high electrode thickness, high active material mass loading, low overhead weight and volume, high capacity, and high energy density. In certain embodiments, the invention provides an alkali metal cell comprising: (a) a quasi-solid polymer cathode containing about 30% to about 95% by volume of a cathode active material (containing a sulfur-containing cathode active material selected from sulfur, a metal-sulfur compound, a sulfur-carbon composite, a sulfur-graphene composite, a sulfur-graphite composite, an organic sulfur compound, a sulfur-polymer composite, or a combination thereof), about 5% to about 40% by volume of a first electrolyte containing an alkali salt dissolved in a solvent, and about 0.01% to about 30% by volume of a conductive additive wherein the conductive additive, containing conductive filaments, forms a 3D network of electron-conducting pathways such that the quasi-solid electrode has an electrical conductivity from about $10^{-6}$ S/cm to about 300 S/cm (may be higher); (b) an anode (may be a conventional anode or a quasi-solid electrode); and (c) an ion-conducting membrane or porous separator disposed between the anode and the quasi-solid cathode; wherein said quasi-solid cathode has a thickness no less than 200 μm. The quasi-solid cathode preferably contains a cathode active material mass loading no less than 10 mg/cm$^2$, preferably no less than 15 mg/cm$^2$, further preferably no less than 25 mg/cm$^2$, more preferably no less than 35 mg/cm$^2$, still more preferably no less than 45 mg/cm$^2$, and most preferably greater than 65 mg/cm$^2$.

In this cell, the anode may also contain a quasi-solid polymer-free anode containing about 30% to about 95% by volume of an anode active material, about 5% to about 40% by volume of a second electrolyte containing an alkali salt dissolved in a solvent, and about 0.01% to about 30% by volume of a conductive additive wherein said conductive additive, containing conductive filaments, forms a 3D network of electron-conducting pathways such that the quasi-solid electrode has an electrical conductivity from about $10^{-6}$ S/cm to about 300 S/cm; wherein said quasi-solid anode has a thickness no less than 200 μm. The quasi-solid anode preferably contains an anode active material mass loading no less than 10 mg/cm$^2$, preferably no less than 15 mg/cm$^2$, further preferably no less than 25 mg/cm$^2$, more preferably no less than 35 mg/cm$^2$, still more preferably no less than 45 mg/cm$^2$, and most preferably greater than 65 mg/cm$^2$. The first electrolyte may be the same as or different from the second electrolyte in composition and structure.

In some embodiments, the alkali metal battery contains a quasi-solid anode, but a conventional cathode. However, preferably, the cathode is a quasi-solid electrode as well.

The present invention also provides a method of producing an alkali metal battery. In certain embodiments, the method comprises:

(a) combining a quantity of an active material (an anode active material or a cathode active material), a quantity of a quasi-solid electrolyte (containing an alkali metal salt dissolved in a solvent having a salt concentration preferably from 2.5 M to 14 M), and a conductive additive to form a deformable and electrically conductive electrode material, wherein the conductive additive, containing conductive filaments, forms a 3D network of electron-conducting pathways; (These conductive filaments, such as carbon nanotubes and graphene sheets, are a mass of randomly aggregated filaments prior to being mixed with particles of an active material and an electrolyte. The mixing procedure involves dispersing these conductive filaments in a highly viscous electrolyte containing particles of an active material. This will be further discussed in later sections.)

(b) forming the electrode material into a quasi-solid electrode, wherein the forming step includes deforming the electrode material into an electrode shape without interrupting the 3D network of electron-conducting pathways such that the electrode maintains an electrical conductivity no less than $10^{-6}$ S/cm (preferably no less than $10^{-5}$ S/cm, more preferably no less than $10^{-4}$ S/cm, further preferably no less than $10^{-3}$ S/cm, still more preferably and typically no less than $10^{-2}$ S/cm, even more typically and preferably no less than $10^{-1}$ S/cm, and further more typically and preferably no less than 1 S/cm; up to 300 S/cm was observed);

(c) forming a second electrode (the second electrode may be a quasi-solid electrode or a conventional electrode); and (d) forming an alkali metal cell by combining the quasi-solid electrode and the second electrode having an ion-conducting separator disposed between the two electrodes.

Figure 1C:
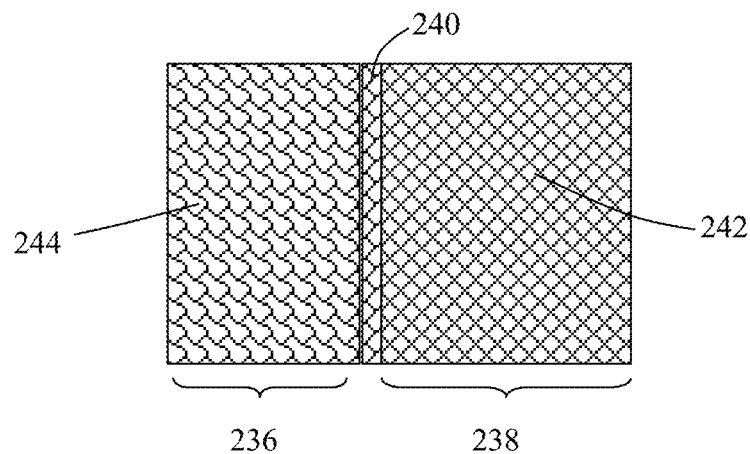
FIG. 1(C) Schematic of a presently invented lithium-sulfur battery cell, comprising a quasi-solid anode (consisting of anode active material particles and conductive filaments directly mixed or dispersed in an electrolyte), a porous separator, and a quasi-solid cathode (consisting of S-containing cathode active material particles and conductive filaments directly mixed or dispersed in an electrolyte). In this embodiment, no resin binder is required.

As illustrated in FIG. 1(C), one preferred embodiment of the present invention is an alkali ion sulfur cell having a conductive quasi-solid anode 236, a conductive quasi-solid cathode 238 (containing a sulfur-containing cathode active material), and a porous separator 240 (or ion-permeable membrane) that electronically separates the anode and the cathode. These three components are typically encased in a protective housing (not shown), which typically has an anode tab (terminal) connected to the anode and a cathode tab (terminal) connected to the cathode. These tabs are for connecting to the external load (e.g. an electronic device to be powered by the battery). In this particular embodiment, the quasi-solid polymer anode 236 contains an anode active material (e.g. particles of Li, Si or hard carbon, not shown in FIG. 1(C)), an electrolyte phase (typically containing a lithium salt or sodium salt dissolved in a solvent); also not shown in FIG. 1(C)), and a conductive additive (containing conductive filaments) that forms a 3D network of electron-conducting pathways 244. Similarly, the quasi-solid cathode contains a sulfur-containing cathode active material, an electrolyte, and a conductive additive (containing conductive filaments) that forms a 3D network of electron-conducting pathways 242.

Figure 1D:
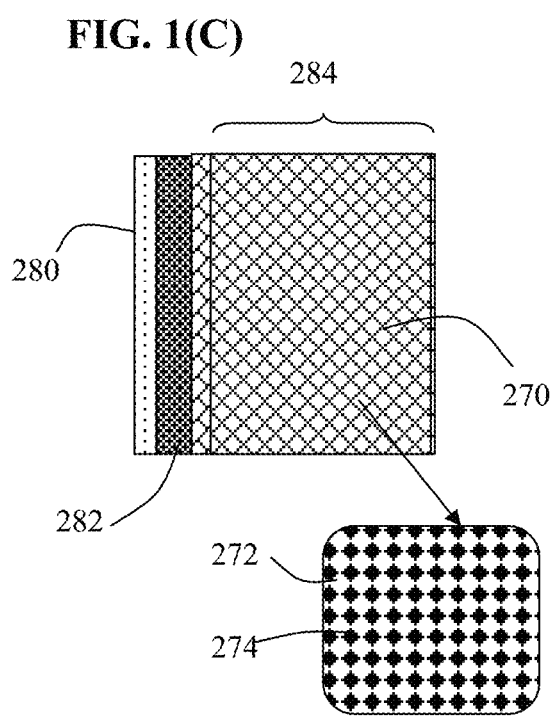
FIG. 1(D) Schematic of a presently invented lithium metal-sulfur battery cell, comprising an anode (containing a lithium metal layer deposited on a Cu foil surface), a porous separator, and a quasi-solid cathode (consisting of S-containing cathode active material particles and conductive filaments directly mixed or dispersed in an electrolyte). In this embodiment, no resin binder is required.

Another preferred embodiment of the present invention, as illustrated in FIG. 1(D), is an alkali metal-sulfur cell having an anode composed of a lithium or sodium metal coating/foil 282 deposited/attached to a current collector 280 (e.g. Cu foil), a quasi-solid cathode 284, and a separator or ion-conducting membrane 282. The quasi-solid cathode 284 contains a cathode active material 272 (e.g. porous carbon particles impregnated with S or lithium polysulfide, or composite particles containing S supported on graphene sheets), an electrolyte phase 274 (typically containing a lithium salt or sodium salt dissolved in a solvent), and a conductive additive phase (containing conductive filaments) that forms a 3D network 270 of electron-conducting pathways.

The electrolyte is preferably a quasi-solid electrolyte containing a lithium salt or sodium salt dissolved in a solvent with a salt concentration no less than 1.5 M, preferably greater than 2.5 M, more preferably greater than 3.5 M, further preferably greater than 5 M, still more preferably greater than 7 M, and even more preferably greater than 10 M. In certain embodiments, the electrolyte is a quasi-solid electrolyte containing a lithium salt or sodium salt dissolved in a liquid solvent with a salt concentration from 3.0 M to 14 M. The choices of lithium salt or sodium salt and the solvent are further discussed in later sections.

Both the quasi-solid anode and the quasi-solid cathode preferably have a thickness greater than 200 µm (preferably greater than 300 µm, more preferably greater than 400 µm, further preferably greater than 500 µm, still more preferably greater than 800 µm, further preferably greater than 1 mm, and can be greater than 5 mm, 1 cm, or thicker. There is no theoretical limitation on the presently invented electrode thickness. In the invented cells, the anode active material typically constitutes an electrode active material loading no less than 10 mg/cm$^2$ (more typically and preferably no less than 20 mg/cm$^2$ and more preferably no less than 30 mg/cm$^2$) in the anode. The cathode active material constitutes an electrode active material mass loading no less than 45 mg/cm$^2$ (typically and preferably greater than 50 mg/cm$^2$ and more preferably greater than 60 mg/cm$^2$) for an inorganic material as the cathode active material (no less than 25 mg/cm$^2$ for an organic or polymeric cathode active material).

In such configurations (FIG. 1(C)-FIG. 1(D)), the electrons only have to travel a short distance (e.g. a few micrometers or less) before they are collected by the conductive filaments that constitute the 3D network of electron-conducting pathways and are present everywhere throughout the entire quasi-solid electrode (an anode or cathode). Additionally, all electrode active material particles are pre-dispersed in an electrolyte solvent (no wettability issue), eliminating the existence of dry pockets commonly present in an electrode prepared by the conventional process of wet coating, drying, packing, and electrolyte injection. Thus, the presently invented process or method has a totally unexpected advantage over the conventional battery cell production process.

These conductive filaments (such as carbon nanotubes and graphene sheets), as supplied, are originally a mass of randomly aggregated filaments prior to being mixed with particles of an active material and an electrolyte. The mixing procedure could involve dispersing these conductive filaments in a highly viscous, solid-like electrolyte containing particles of an active material. This is not a trivial task as one might think. The dispersion of nano materials (particularly nano filament materials, such as carbon nanotubes, carbon nanofibers, and graphene sheets) in a highly flowable (non-viscous) liquid has been known to be notoriously difficult, let alone in a highly viscous quasi-solid, such as an electrolyte containing a high loading of an active material (e.g. solid particles, such as Si nano particles for the anode and lithium cobalt oxide for the cathode). This problem is further exacerbated, in some preferred embodiments, by the notion that the electrolyte itself is a quasi-solid electrolyte, containing a high concentration of lithium salt or sodium salt and a polymer in a solvent.

In certain embodiments of instant invention, the formation of electrode layers may be accomplished by using the following sequences of steps:

Sequence 1 (S1): A lithium salt or sodium salt (e.g. LiBF$_4$) and an ion-conducting polymer (e.g. PEO) may be dissolved in a mixture of PC and DOL first to form an electrolyte having a desired combined salt/polymer concentration. Then, conductive filaments (e.g. carbon nanofibers, reduced graphene oxide sheets, or CNTs) are dispersed in the electrolyte to form a filament-electrolyte suspension. Mechanical shearing may be used to help forming uniform dispersion. (This filament-electrolyte suspension, even with a low salt concentration of 1.0 M, is quite viscous). Particles of cathode active materials (e.g. S/carbon composite particles) are then dispersed in the filament-electrolyte suspension to form a quasi-solid electrode material.

Sequence 2 (S2): A lithium salt or sodium salt is dissolved in a mixture of PC and DOL first to form an electrolyte having a desired salt concentration. Then, particles of the cathode active material are dispersed in the electrolyte to form an active particle-electrolyte suspension. Mechanical shearing may be used to help forming uniform dispersion. Conductive filaments are then dispersed in the active particle-electrolyte suspension to form a quasi-solid electrode material.

Sequence 3 (S3): This is a preferred sequence. First, a desired amount of conductive filaments is dispersed in the liquid solvent mixture (e.g. PC+DOL) containing no lithium salt dissolved therein. Mechanical shearing may be used to help forming uniform suspension of conducting filaments in the solvent. Then, lithium salt or sodium salt is added into the suspension, allowing the salt to get dissolved in the solvent mixture of the suspension to form an electrolyte having a desired combined salt/polymer concentration. Concurrently or subsequently, active material particles are dispersed in the electrolyte to form a deformable quasi-solid electrode material, which is composed of active material particles and conducting filaments dispersed in a quasi-solid electrolyte (not a liquid electrolyte and not a solid electrolyte). In this quasi-solid electrode material, the conducting filaments percolate to form a 3D network of electron-conducting pathways. This 3D conducting network is maintained when the electrode material is shaped into an electrode of a battery.

In some preferred embodiments, the electrolyte contains an alkali metal salt (lithium salt and/or sodium salt) dissolved in an organic or ionic liquid solvent with an alkali metal salt concentration sufficiently high so that the electrolyte exhibits a vapor pressure less than 0.01 kPa or less than 0.6 (60%) of the vapor pressure of the solvent alone (when measured at 20° C.), a flash point at least 20 degrees Celsius higher than a flash point of the first organic liquid solvent alone (when no lithium salt is present), a flash point higher than 150° C., or no detectable flash point at all.

Most surprising and of tremendous scientific and technological significance is our discovery that the flammability of any volatile organic solvent can be effectively suppressed provided that a sufficiently high amount of an alkali metal salt is added to and dissolved in this organic solvent to form a solid-like or quasi-solid electrolyte. In general, such a quasi-solid electrolyte exhibits a vapor pressure less than 0.01 kPa and often less than 0.001 kPa (when measured at 20° C.) and less than 0.1 kPa and often less than 0.01 kPa (when measured at 100° C.). (The vapor pressures of the corresponding neat solvent, without any alkali metal salt dissolved therein, are typically significantly higher.) In many cases featuring the quasi-solid electrolyte, the vapor molecules are practically too few to be detected.

A highly significant observation is that the high solubility of the alkali metal salt in an otherwise highly volatile solvent (a large molecular ratio or molar fraction of alkali metal salt, typically >0.2, more typically >0.3, and often >0.4 or even >0.5) can dramatically curtail the amount of volatile solvent molecules that can escape into the vapor phase in a thermodynamic equilibrium condition. In many cases, this has effectively prevented the flammable solvent gas molecules from initiating a flame even at an extremely high temperature (e.g. using a torch). The flash point of the quasi-solid polymer electrolyte is typically at least 20 degrees (often >50 or >100 degrees) higher than the flash point of the neat organic solvent alone. In most of the cases, either the flash point is higher than 150° C. or no flash point can be detected. The electrolyte just would not catch on fire. Furthermore, any accidentally initiated flame does not sustain for longer than a few seconds. This is a highly significant discovery, considering the notion that fire and explosion concern has been a major impediment to widespread acceptance of battery-powered electric vehicles. This new technology could significantly help accelerate the emergence of a vibrant EV industry.

There has been no previous study reported on the vapor pressure of ultra-high concentration battery electrolytes (with a high molecular fraction, e.g. >0.2 or >0.3, of alkali metal salt or salt concentration approximately >2.5 M or 3.5 M) for safety considerations. This is truly unexpected and of utmost technological and scientific significance.

We have further unexpectedly discovered that the presence of a 3D network of electron-conducting pathways, constituted by the conducting nano-filaments, acts to further reduce the threshold concentration of the alkali metal salt that is required for achieving critical vapor pressure suppression.

Another surprising element of the present invention is the notion that we are able to dissolve a high concentration of an alkali metal salt in just about every type of commonly used battery-grade organic solvent to form a quasi-solid electrolyte suitable for use in a rechargeable alkali metal battery. Expressed in a more easily recognizable term, this concentration is typically greater than 2.5 M (mole/liter), more typically and preferably greater than 3.5 M, still more typically and preferably greater than 5 M, further more preferably greater than 7 M, and most preferably greater than 10 M. With a salt concentration no less than 2.5 M, the electrolyte is no longer a liquid electrolyte; instead, it is a quasi-solid electrolyte. In the art of lithium or sodium battery, such a high concentration of alkali metal salt in a solvent has been generally considered impossible, nor desirable. However, we have found that these quasi-solid electrolytes are surprisingly good electrolytes for both lithium and sodium batteries in terms of significantly improved safety (non-flammability), improved energy density, and improved power density.

In addition to the non-flammability and high alkali metal ion transference numbers as discussed above, there are several additional benefits associated with using the presently invented quasi-solid electrolytes. As one example, the quasi-solid electrolyte, when implemented at least in the anode, can significantly enhance cyclic and safety performance of rechargeable alkali metal-sulfur batteries through effective suppression of dendrite growth likely for the following reasons:

1) It is generally accepted that dendrites start to grow in the non-aqueous liquid electrolyte when the anion is depleted in the vicinity of the electrode where plating occurs. In the ultrahigh concentration electrolyte, there is a mass of anions to keep the balance of cations ($Li^+$ or $Na^+$) and anions near metallic lithium or sodium anode.
2) Further, the space charge created by anion depletion is minimal, which is not conducive to dendrite growth.
3) The presence of a 3D network of electron-conducting pathways, constituted by the conductive filaments, provide a more uniform electric field in the anode, promoting more uniform lithium or sodium deposition.
4) Furthermore, due to both ultrahigh Li or Na salt concentration and high Li-ion or Na-ion transference number, the quasi-solid electrolyte provides a large amount of available lithium-ion or sodium-ion flux and raises the lithium or sodium ionic mass transfer rate between the electrolyte and the lithium or sodium electrode, thereby enhancing the lithium or sodium deposition uniformity and dissolution during charge/discharge processes.
5) Additionally, the local high viscosity induced by a high concentration will increase the pressure from the electrolyte to inhibit dendrite growth, potentially resulting in a more uniform deposition on the surface of the anode. The high viscosity could also limit anion convection near the deposition area, promoting more uniform deposition of sodium ions. Same reasoning is applicable to lithium metal batteries.

These reasons, separately or in combination, are believed to be responsible for the notion that no dendrite-like feature has been observed with any of the large number of rechargeable alkali metal-sulfur cells that we have investigated thus far.

Furthermore, a skilled artisan in the field of chemistry or materials science would have anticipated that such a high salt concentration should make the electrolyte behave like a solid with an extremely high viscosity and, hence, this electrolyte should not be amenable to fast diffusion of alkali metal ions therein. Consequently, the artisan would have expected that an alkali metal battery containing such a solid-like electrolyte would not and could not exhibit a high capacity at a high charge-discharge rate or under a high current density condition (i.e. the battery should have a poor rate capability). Contrary to these expectations by a person of ordinary skills or even exceptional skills in the art, all the alkali metal-sulfur cells containing such a quasi-solid electrolyte deliver high energy density and high power density for a long cycle life. It appears that the quasi-solid electrolytes as herein invented and disclosed are conducive to facile alkali metal ion transport. This surprising observation is likely due to two major factors: one related to the internal structure of the electrolyte and the other related to a high $Na^+$ or $Li^+$ ion transference number (TN).

Figure 2A:
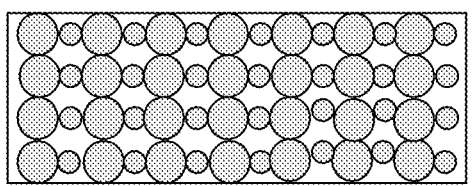
FIG. 2(A) Schematic of the closely packed, highly ordered structure of a solid electrolyte.
Figure 2B:
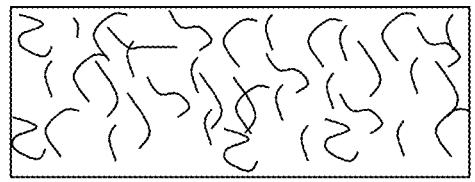
FIG. 2(B) Schematic of a totally amorphous liquid electrolyte having large fractions of free volume through which cations (e.g. $Li^+$ or $Na^+$) can easily migrate.
Figure 2C:
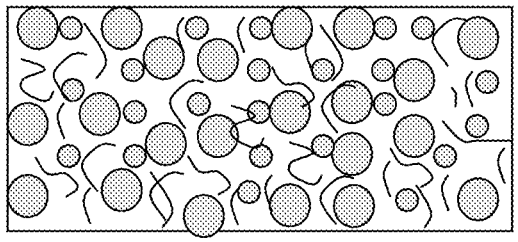
FIG. 2(C) Schematic of the randomized or amorphous structure of a quasi-solid electrolyte having solvent molecules separating salt species to produce amorphous zones for easy migration of free (un-clustered) cations. The lithium salt or sodium salt is brought into a saturated or supersaturated state that remains substantially amorphous.
Figure 3A:
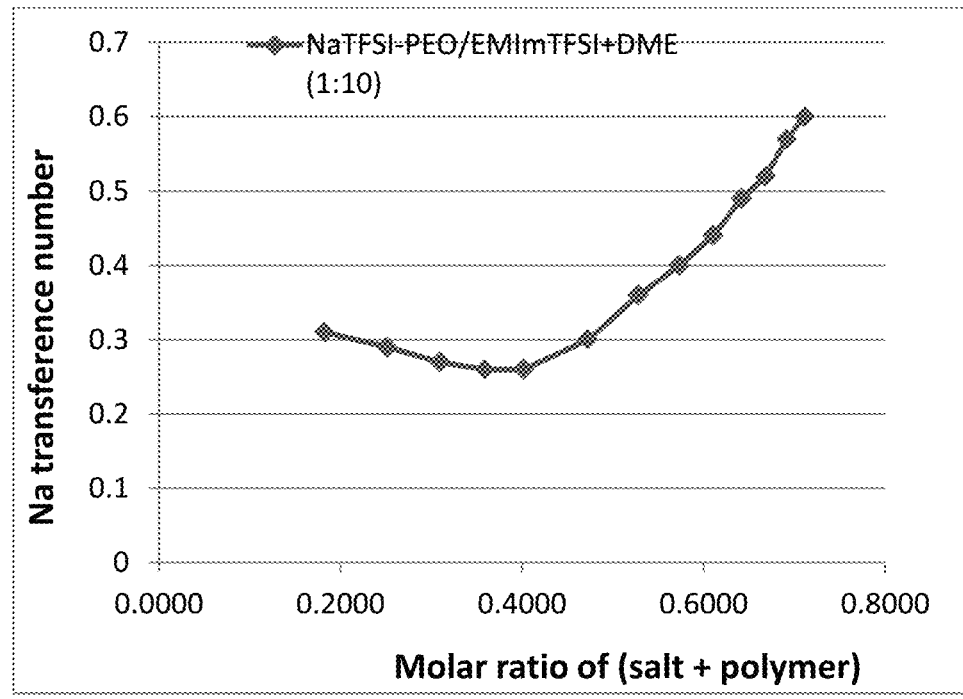
FIG. 3(A) The $Na^+$ ion transference numbers of electrolytes (e.g. (NaTFSI salt) in (DOL+DME) solvents) in relation to the sodium salt molecular ratio x.
Figure 3B:
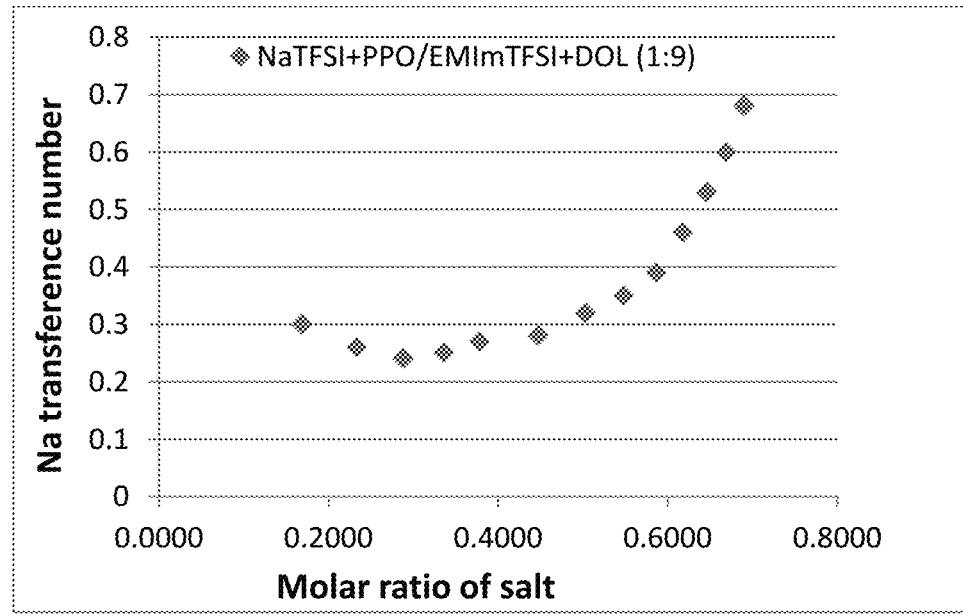
FIG. 3(B) The $Na^+$ ion transference numbers of electrolytes (e.g. (NaTFSI salt) in (EMImTFSI+DOL) solvents) in relation to the sodium salt molecular ratio x.
Figure 4:
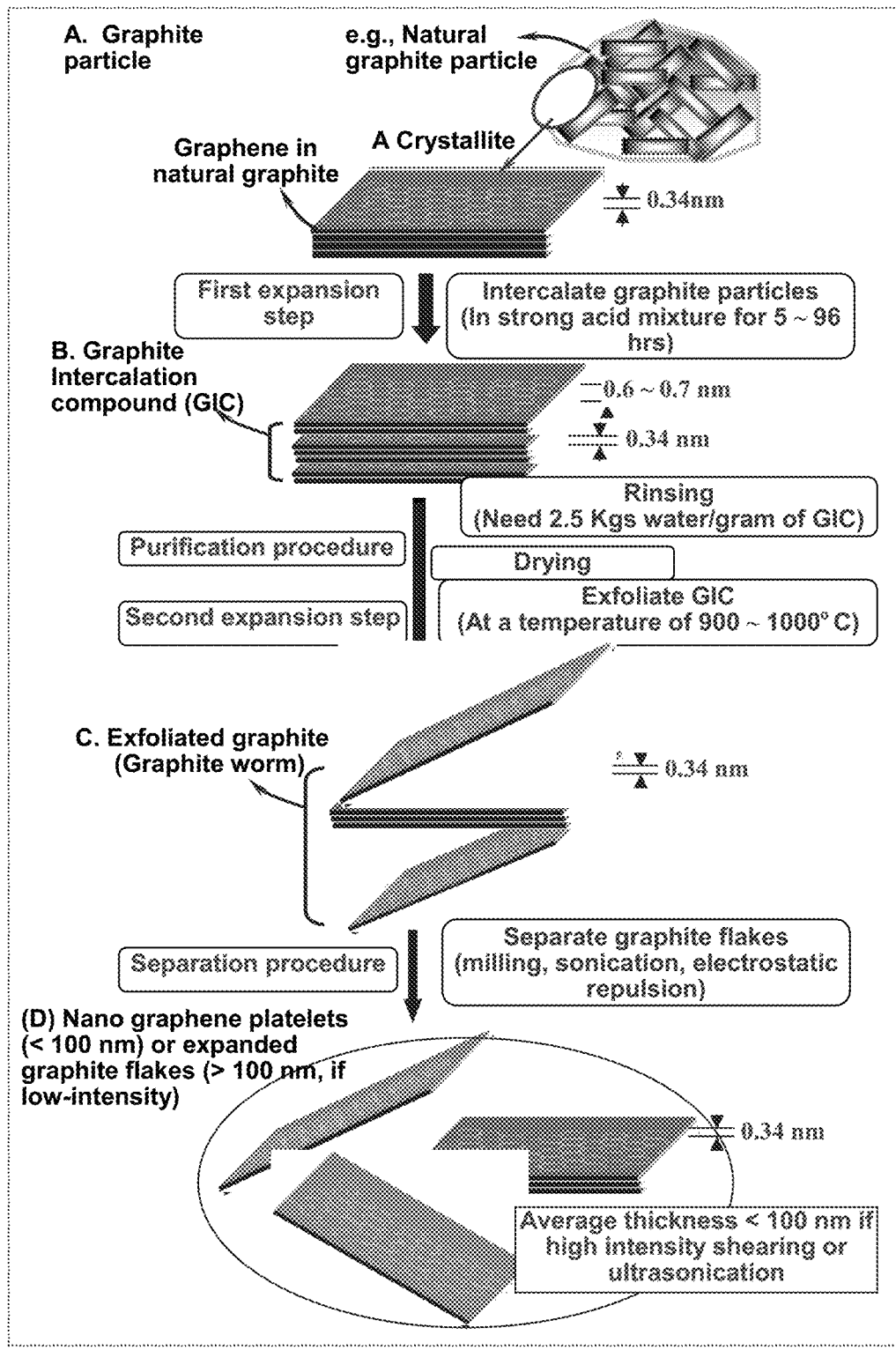
FIG. 4 Schematic of a commonly used process for producing exfoliated graphite, expanded graphite flakes (thickness >100 nm), and graphene sheets (thickness <100 nm, more typically <10 nm, and can be as thin as 0.34 nm).

Not wishing to be bound by theory, but one can visualize the internal structure of three fundamentally different types of electrolytes by referring to FIG. 2(A)-FIG. 3(C). FIG. 2(A) schematically shows the closely packed, highly ordered structure of a typical solid electrolyte, wherein there is little free volume for diffusion of alkali metal ions. Migration of any ions in such a crystal structure is very difficult, leading to an extremely low diffusion coefficient ($10^{-16}$ to $10^{-12}$ cm$^2$/sec) and extremely low ion conductivity (typically from $10^{-7}$ S/cm to $10^{-4}$ S/cm). In contrast, as schematically shown in FIG. 2(B), the internal structure of liquid electrolyte is totally amorphous, having large fractions of free volume through which cations (e.g. or $Li^+$ or $Na^+$) can easily migrate, leading to a high diffusion coefficient ($10^{-8}$ to $10^{-6}$ cm$^2$/sec) and high ion conductivity (typically from $10^{-3}$ S/cm to $10^{-2}$ S/cm). However, liquid electrolyte containing a low concentration of alkali metal salt is flammable and prone to dendrite formation, posing fire and explosion danger. Schematically shown in FIG. 2(C) is the randomized or amorphous structure of a quasi-solid electrolyte having solvent molecules separating salt species to produce amorphous zones for easy migration of free (un-clustered) cations. Such a structure is amenable to achieving a high ion conductivity value (typically $10^{-4}$ S/cm to $8\times10^{-3}$ S/cm), yet still maintaining non-flammability. There are relatively few solvent molecules and these molecules are being retained (prevented from vaporizing) by overwhelmingly large numbers of salt species, polymer chain segments, and the network of conducting filaments.

In the invented Li—S or Na—S cell, the anode typically contains Li or Na metal in the form of a metal foil, thin film or thin coating (<50 μm in thickness) deposited on a current collector (e.g. Cu foil or 3D graphene nano-structure).

In some embodiment, the anode active material is a prelithiated or pre-sodiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nanotube, or a combination thereof. Graphene materials are also a good conductive additive for both the anode and cathode active materials of a lithium battery.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Figure 5A:
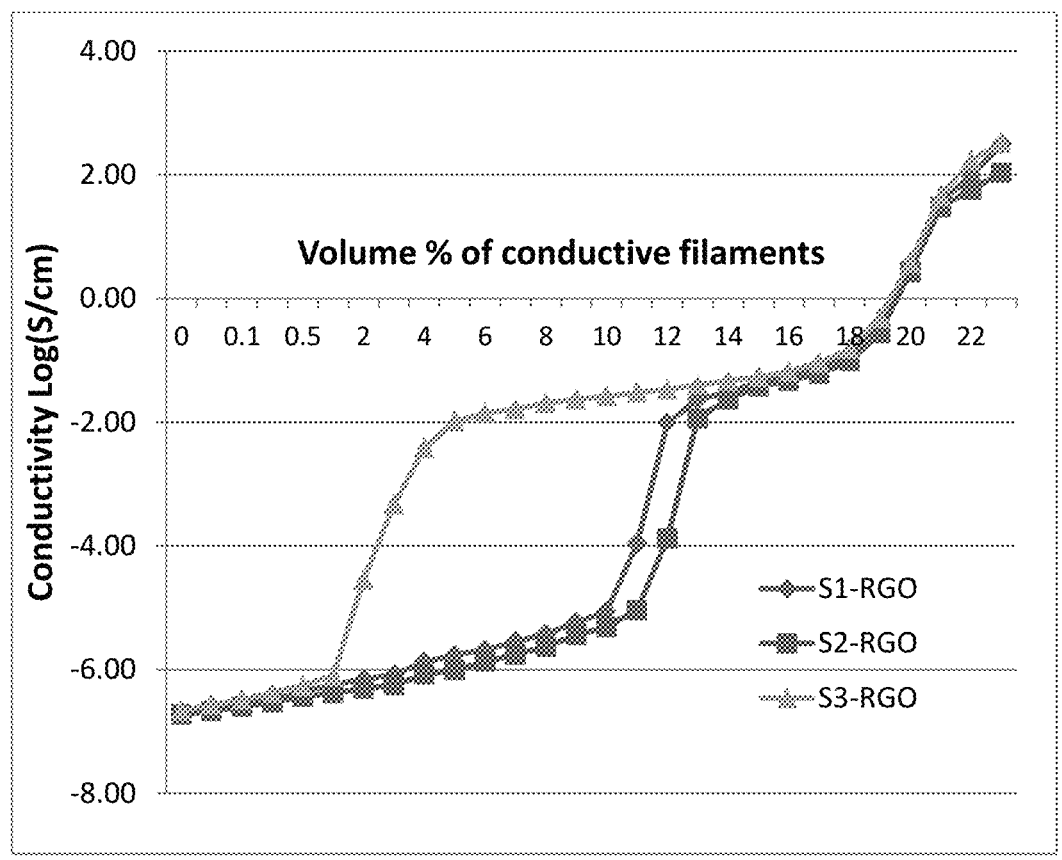
FIG. 5(A) The electrical conductivity (percolation behavior) of conducting filaments in a quasi-solid electrode, plotted as a function of the volume fraction of conductive filaments (carbon nanofibers).
Figure 5B:
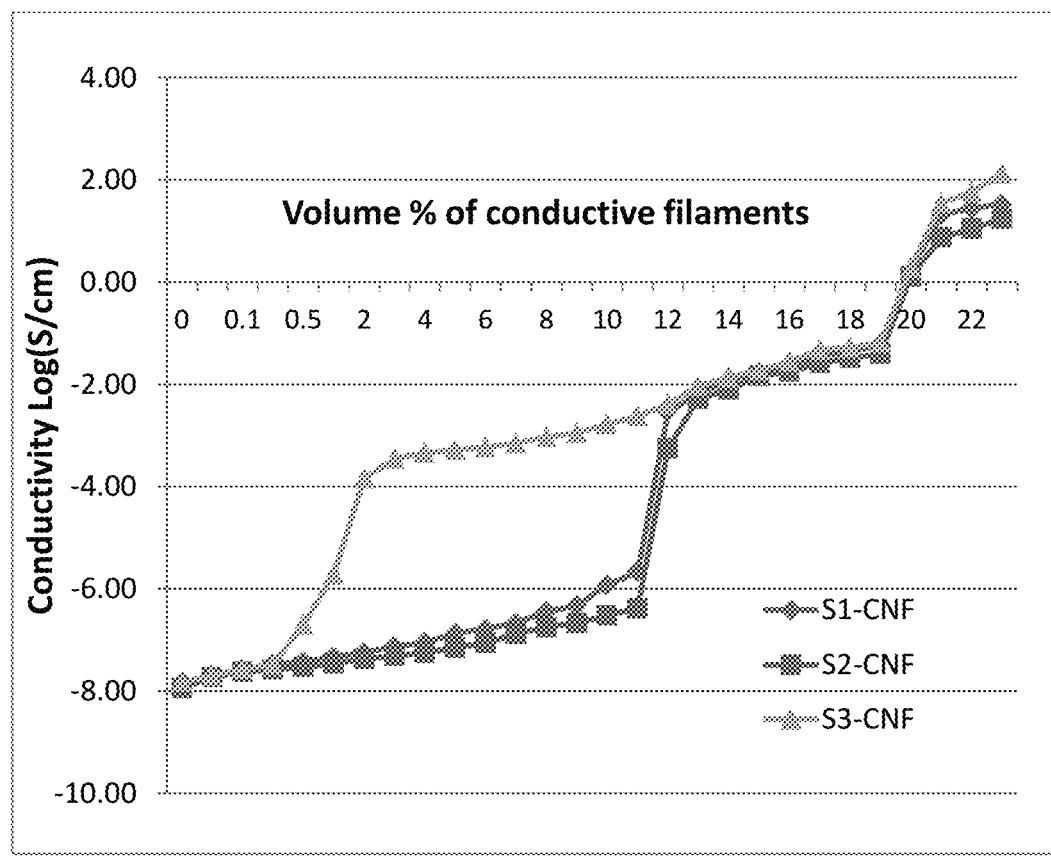
FIG. 5(B) The electrical conductivity (percolation behavior) of conducting filaments in a quasi-solid electrode, plotted as a function of the volume fraction of conductive filaments (reduced graphene oxide sheets).

In one process, graphene materials are obtained by intercalating natural graphite particles with a strong acid and/or an oxidizing agent to obtain a graphite intercalation compound (GIC) or graphite oxide (GO), as illustrated in FIG. 5. The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder in a mixture of sulfuric acid, nitric acid (an oxidizing agent), and another oxidizing agent (e.g. potassium permanganate or sodium perchlorate). The resulting GIC is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms", which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation base been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

There is no restriction on the types of anode active materials that can be used in practicing the instant invention. Preferably, in the invented lithium-sulfur cell, the anode active material absorbs lithium ions at an electrochemical potential of less than 1.0 volt (preferably less than 0.7 volts) above the Li/Li$^+$ (i.e. relative to Li→Li$^+$+e$^-$ as the standard potential) when the battery is charged. In one preferred embodiment, the anode active material of a lithium battery is selected from the group consisting of: (a) Particles of lithium metal or a lithium metal alloy; (b) Natural graphite particles, artificial graphite particles, meso-carbon microbeads (MCMB), carbon particles (including soft carbon and hard carbon), needle coke, carbon nanotubes, carbon nanofibers, carbon fibers, and graphite fibers; (c) Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (d) Alloys or intermetallic compounds of Si, Ge, Sn, Pb, Sb, Bi, Zn, Al, or Cd with other elements, wherein said alloys or compounds are stoichiometric or non-stoichiometric; (e) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; (f) Pre-lithiated versions thereof; (g) Pre-lithiated graphene sheets; and combinations thereof.

In certain embodiments, the alkali metal-sulfur cell is a sodium-ion sulfur cell and the active material is an anode active material containing a sodium intercalation compound selected from petroleum coke, carbon black, amorphous carbon, activated carbon, hard carbon (carbon that is difficult to graphitize), soft carbon (carbon that can be readily graphitized), templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In certain embodiments, the alkali metal-sulfur cell is a sodium metal-sulfur cell or sodium-ion sulfur cell and the active material is an anode active material selected from the group consisting of: (a) Particles of sodium metal or a sodium metal alloy; (b) Natural graphite particles, artificial graphite particles, meso-carbon microbeads (MCMB), carbon particles, needle coke, carbon nanotubes, carbon nanofibers, carbon fibers, and graphite fibers; (c) Sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (d) Sodium-containing alloys or intermetallic compounds of Si, Ge, Sn, Pb, Sb, Bi, Zn, Al, Ti, Co, Ni, Mn, Cd, and their mixtures; (e) Sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (f) Sodium salts; and (g) Graphene sheets pre-loaded with sodium ions; and combinations thereof.

A wide variety of sulfur-based cathode active materials can be used to practice the presently invented lithium-sulfur or sodium-sulfur cell. Such a sulfur-containing cathode active material may be selected from sulfur, a metal-sulfur compound (e.g. lithium polysulfide), a sulfur-carbon composite (e.g. carbon black-S composite prepared by ball-milling, or porous carbon particles impregnated with S), a sulfur-graphene composite, a sulfur-graphite composite, an organic sulfur compound, a sulfur-polymer composite, or a combination thereof.

In some embodiments, the cathode active material may be selected from sulfur or sulfur compound supported by or bonded to a functional material or nano-structured material. The functional material or nano-structured material may be selected from the group consisting of (a) a nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon; (b) a nano graphene platelet selected from a single-layer graphene sheet or multi-layer graphene platelet; (c) a carbon nanotube selected from a single-walled carbon nanotube or multi-walled carbon nanotube; (d) a carbon nano-fiber, nano-wire, metal oxide nano-wire or fiber, conductive polymer nano-fiber, or a combination thereof (e) a carbonyl-containing organic or polymeric molecule; (f) a functional material containing a carbonyl, carboxylic, or amine group; and combinations thereof.

The functional material or nano-structured material may be selected from the group consisting of Poly(2,5-dihydroxy-1,4-benzoquinone-3,6-methylene), $Na_xC_6O_6$ (x=1-3), $Na_2(C_6H_2O_4)$, $Na_2C_8H_4O_4$ (Na terephthalate), $Na_2C_6H_4O_4$ (Li trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof. Desirably, the functional material or nano-structured material has a functional group selected from —COOH, =O, —$NH_2$, —OR, or —COOR, where R is a hydrocarbon radical.

Non-graphene 2D nano materials, single-layer or few-layer (up to 20 layers), can be produced by several methods: mechanical cleavage, laser ablation (e.g. using laser pulses to ablate TMDs down to a single layer), liquid phase exfoliation, and synthesis by thin film techniques, such as PVD (e.g. sputtering), evaporation, vapor phase epitaxy, liquid phase epitaxy, chemical vapor epitaxy, molecular beam epitaxy (MBE), atomic layer epitaxy (ALE), and their plasma-assisted versions.

A wide range of electrolytes can be used for practicing the instant invention. Most preferred are non-aqueous organic and/or ionic liquid electrolytes. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

For sodium cells, the electrolyte (including non-flammable quasi-solid electrolyte) may contain a sodium salt preferably selected from sodium perchlorate ($NaClO_4$), sodium hexafluorophosphate ($NaPF_6$), sodium borofluoride ($NaBF_4$), sodium hexafluoroarsenide, sodium trifluorometasulfonate ($NaCF_3SO_3$), bis-trifluoromethyl sulfonylimide sodium ($NaN(CF_3SO_2)_2$), an ionic liquid salt, or a combination thereof.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In what follows, we provide some examples of several different types of anode active materials, sulfur-based cathode active materials, and ion-conducting polymers to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

Example 1: Preparation of Graphene Oxide (GO) and Reduced Graphene Oxide (RGO) Nano Sheets from Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 µL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

RGO was used as a conductive additive in either or both of the anode and cathode active material in certain lithium-sulfur batteries presently invented. Pre-lithiated RGO (e.g. RGO+lithium particles or RGO pre-deposited with lithium coating) was also used as an anode active material in selected lithium-sulfur cells.

For comparison purposes, slurry coating and drying procedures were conducted to produce conventional electrodes. One anode and one cathode, and a separator disposed between the two electrodes, were then assembled and encased in an Al-plastic laminated packaging envelop, followed by liquid electrolyte injection to form a prior art lithium battery cell.

Example 2: Preparation of Pristine Graphene Sheets (Essentially 0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a conductive additive having a high electrical and thermal conductivity. Pre-lithiated pristine graphene was also used as an anode active material. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

Pristine graphene sheets, as a conductive additive, along with an anode active material (or cathode active material in the cathode) were then incorporated in a battery using both the presently invented procedure of slurry injection into foam pores and conventional procedure of slurry coating, drying and layer laminating. Both lithium-ion sulfur batteries and lithium metal-sulfur batteries were investigated.

Example 3: Preparation of Prelithiated Graphene Fluoride Sheets as an Anode Active Material of a Lithium-Ion Battery Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. The graphene fluoride powder was mixed with surface-stabilized lithium powder in a liquid electrolyte, allowing for pre-lithiation to occur.

Example 4: Some Examples of Preferred Salts, Solvents, and Polymers for Forming Quasi-Solid Polymer Electrolytes Preferred sodium metal salts include: sodium perchlorate ($NaClO_4$), sodium hexafluorophosphate ($NaPF_6$), sodium borofluoride ($NaBF_4$), sodium hexafluoroarsenide, potassium hexafluoroarsenide, sodium trifluoro-metasulfonate ($NaCF_3SO_3$), and bis-trifluoromethyl sulfonylimide sodium ($NaN(CF_3SO_2)_2$). The following are good choices for lithium salts that tend to be dissolved well in selected organic or ionic liquid solvents: lithium borofluoride ($LiBF_4$), lithium trifluoro-metasulfonate ($LiCF_3SO_3$), lithium bis-trifluoromethyl sulfonylimide ($LiN(CF_3SO_2)_2$ or LITFSI), lithium bis(oxalato)borate (LiBOB), lithium oxalyldifluoroborate ($LiBF_2C_2O_4$), and lithium bisperfluoroethy-sulfonylimide (LiBETI). A good electrolyte additive for helping to stabilize Li metal is $LiNO_3$. Particularly useful ionic liquid-based lithium salts include: lithium bis(trifluoro methanesulfonyl)imide (LiTFSI).

For aqueous electrolyte, sodium salt or potassium salt is preferably selected from $Na_2SO_4$, $K_2SO_4$, a mixture thereof, NaOH, KOH, NaCl, KCl, NaF, KF, NaBr, KBr, NaI, KI, or a mixture thereof. The salt concentrations used in the present study were from 0.3M to 3.0 M (most often 0.5M to 2.0M).

Preferred organic liquid solvents include: ethylene carbonate (EC), dimethyl carbonate (DMC), methylethyl carbonate (MEC), diethyl carbonate (DEC), propylene carbonate (PC), acetonitrile (AN), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), hydrofloroether (e.g. TPTP), sulfone, and sulfolane.

Preferred ionic liquid solvents may be selected from a room temperature ionic liquid (RTIL) having a cation selected from tetraalkylammonium, di-alkylimidazolium, alkylpyridinium, dialkyl-pyrrolidinium, or dialkylpiperidinium. The counter anion is preferably selected from $BF_4^-$, $B(CN)_4^-$, $CF_3CO_2^-$, $CF_3SO_3^-$, $N(SO_2CF_3)_2^-$, $N(COCF_3)(SO_2CF_3)^-$, or $N(SO_2F)_2^-$. Particularly useful ionic liquid-based solvents include N-n-butyl-N-ethylpyrrolidinium bis(trifluoromethane sulfonyl)imide (BEPyTFSI), N-methyl-N-propylpiperidinium bis(trifluoromethyl sulfonyl)imide ($PP_{13}TFSI$), and N,N-diethyl-N-methyl-N-(2-methoxyethyl) ammonium bis(trifluoromethylsulfonyl)imide.

Example 5: Vapor Pressure of Some Solvents and Corresponding Quasi-Solid Electrolytes with Various Sodium Salt Molecular Ratios Vapor pressures of several solvents (DOL, DME, PC, AN, with or without an ionic liquid-based co-solvent, $PP_{13}TFSI$) before and after adding a wide molecular ratio range of sodium salts, such as sodium borofluoride ($NaBF_4$), sodium perchlorate ($NaClO_4$), or sodium bis(trifluoro methanesulfonyl)imide (NaTFSI were measured. The vapor pressure drops at a very high rate when the salt concentration exceeds 2.3 M, and rapidly approaches a minimal or essentially zero when the salt concentration exceeds 3.0 M. With a very low vapor pressure, the vapor phase of the electrolyte either cannot ignite or cannot sustain a flame for longer than 3 seconds once initiated.

Example 6: Flash Points and Vapor Pressure of Some Solvents and Corresponding Quasi-Solid Electrolytes with a Sodium or Lithium Salt Concentration of 3.0M The flash points and vapor pressures of several solvents and their electrolytes with a Na or Li salt concentration of 3 M are presented in Table 1 below. It may be noted that, according to the OSHA (Occupational Safety & Health Administration) classification, any liquid with a flash point below 38.7° C. is flammable. However, in order to ensure safety, we have designed our quasi-solid polymer electrolytes to exhibit a flash point significantly higher than 38.7° C. (by a large margin, e.g. at least increased by 50° and preferably above 150° C.). The data in Table 1 indicate that the addition of an alkali metal salt concentration of 3.0M is normally sufficient to meet these criteria (in many cases, 2.3 M is sufficient). All our quasi-solid electrolytes are not flammable.

TABLE 1

The flash points and vapor pressures of select solvents and their electrolytes.

| Chemical | Flash point (° C.) | Flash point (° C.) with 3.0M concentration | Vapor pressure (kPa) at 20° C., no solute | Vapor pressure (kPa) at 20° C. with 3.0M |
|---|---|---|---|---|
| Acetone | −17 | — | 24 kPa (240 hPa) | — |
| Ethanol | 17 | — | | |
| DOL (1,3-dioxolane) | 1 | 90 (LiBF$_4$) | 9.33 (70 Torr) | 2.1 |
| DOL | 1 | 195 (LiCF$_3$SO$_3$); 193 (NaCF$_3$SO$_3$) | 9.33 | 0.6 (LiCF$_3$SO$_3$); 0.45 (LiCF$_3$SO$_3$) |
| DEC (diethyl carbonate) | 33 | >200 (LiCF$_3$SO$_3$) | 1.33 (10 Torr) | 0.025 (LiCF$_3$SO$_3$) |
| DMC (Dimethyl carbonate) | 18 | >200 (LiCF$_3$SO$_3$) | 2.40 (18 Torr) | <0.1 (LiCF$_3$SO$_3$) |
| EMC (ethyl methyl carbonate) | 23 | >200 (LiBOB) | 3.60 (27 Torr) | <0.1(LiBOB) |
| EC (ethylene carbonate) | 145 | No flash point (LiBOB) | <0.0013 (0.02 Torr at 36.4° C.) | <0.001 (LiBOB) |
| PC (propylene carbonate) | 132 | No flash point (LiBOB) | 0.0173 (0.13 Torr) | <0.01 (LiBOB) |
| γ-BL (gamma-butyrolactone) | 98 | No flash point (LiBOB) | 0.20 (1.5 Torr) | <0.01 (LiBOB) |
| AN (Acetonitrile) | 6 | 99 (LiBF$_4$) 108 (NaBF$_4$) | 9.71 (88.8 Torr at 25° C.) | <1.0 (LiBF$_4$) 0.7 (NaBF$_4$) |
| EA (Ethyl acetate) + DOL | −3 | 80 (LiBF$_4$) | 9.73 | 0.5 (LiBF$_4$) |
| DME (1,2-dimethoxyethane) | −2 | 71 (LiPF$_6$) 85 (NaPF$_6$) | 6.40 (48 Torr) | <1.0 (LiPF$_6$) <1.0 (LiPF$_6$) |
| VC (vinylene carbonate) | 53.1 | >200 (LiPF$_6$) | 11.98 (89.9 Torr) | 0.3 (LiPF$_6$) |
| TEGDME (tetraethylene glycol dimethylether) | 141 | No flash point (LiPF$_6$) | <0.0013 (<0.01 Torr) | <0.001 |
| FEC (Fluoro ethylene carbonate) | 122 | No flash point (LiPF$_6$) | 0.021 | <0.01 |
| IL (1-ethyl-3-methyl imadazolium TFSI) | 283 | No flash point (NaTFSI) | — | — |

\* As per OSHA (Occupational Safety & Health Administration) classification, any liquid with a flash point below 38.7° C. is flammable;
\*\* 1 standard atmosphere = 101,325 Pa = 101.325 kPa = 1,013.25 hPa. 1 Torr = 133.3 Pa = 0.1333 kPa Example 7: Alkali Metal Ion Transference Numbers in Several Electrolytes The Na$^+$ ion transference numbers of several types of electrolytes (e.g. (PEO+NaTFSI salt) in (EMImTFSI+DME) solvents) in relation to the lithium salt molecular ratio were studied and representative results are summarized in FIG. 3(A)-FIG. 3(B). In general, the Na$^+$ ion transference number in low salt concentration electrolytes decreases with increasing concentration from x=0 to x=0.2-0.30. However, beyond molecular ratios of x=0.2-0.30, the transference number increases with increasing salt concentration, indicating a fundamental change in the Na$^+$ ion transport mechanism. A similar trend for lithium ions was also observed.

When Na$^+$ ions travel in a low salt concentration electrolyte (e.g. x<0.2), a Na$^+$ ion can drag multiple solvating molecules along with it. The coordinated migration of such a cluster of charged species can be further impeded if the fluid viscosity is increased due to more salt dissolved in the solvent. In contrast, when an ultra-high concentration of sodium salt with x>0.2 is present, Na$^+$ ions could significantly out-number the available solvating molecules that otherwise could cluster the sodium ions, forming multi-ion complex species and slowing down their diffusion process. This high Na$^+$ ion concentration makes it possible to have more "free Na$^+$ ions" (non-clustered), thereby providing a higher Na$^+$ transference number (hence, a facile Na$^+$ transport). The sodium ion transport mechanism changes from a multi-ion complex-dominating one (with an overall larger hydrodynamic radius) to single ion-dominating one (with a smaller hydrodynamic radius) having a large number of available free Na$^+$ ions. This observation has further asserted that an adequate number of Na$^+$ ions can quickly move through or from the quasi-solid electrolytes to make themselves readily available to interact or react with a cathode (during discharge) or an anode (during charge), thereby ensuring a good rate capability of a sodium secondary cell. Most significantly, these highly concentrated electrolytes are non-flammable and safe. Combined safety, facile sodium ion transport, and electrochemical performance characteristics have been thus far difficult to come by for all types of sodium and lithium secondary batteries.

Example 8: Preparation of Sulfur/Carbon Black (S/CB) Composite Particles for the Cathode of a Lithium-Sulfur Battery Sulfur powder and CB particles were mixed (70/30 ratio) and ball-milled for 2 hours to obtain S/CB particles. In this example, graphene sheets (RGO) and carbon nano-fiber (CNF) were separately included as conductive filaments in an electrode containing S/CB particles as a cathode active material and an electrolyte (containing lithium salt dissolved in an organic solvent). The lithium salt used in this example includes lithium borofluoride (LiBF$_4$), and the organic solvents are PC, DOL, DEC, and their mixtures. A wide range of conducting filament volume fractions from 0.1% to 30% was included in this study. The formation of electrode layers was accomplished by using the following sequences of steps:

Sequence 1 (S1): LiBF$_4$ salt and PEO were dissolved in a mixture of PC and DOL first to form an electrolyte having a combined salt/polymer concentration of 1.0 M, 2.5 M, and 3.5 M, respectively. (With a concentration of 2.3 M or higher, the resulting electrolyte was no longer a liquid electrolyte. It actually behaves like a solid and, hence, the term "quasi-solid".) Then, RGO or CNT filaments were dispersed in the electrolyte to form a filament-electrolyte suspension. Mechanical shearing was used to help forming uniform dispersion. (This filament-electrolyte suspension, even with a low salt concentration of 1.0 M, was also quite viscous). S/CB particles, the cathode active material, were then dispersed in the filament-electrolyte suspension to form a quasi-solid electrode material.

Sequence 2 (S2): $LiBF_4$ salt was dissolved in a mixture of PC and DOL first to form an electrolyte having a salt concentration of 1.0 M, 2.5 M, and 3.5 M, respectively. Then, S/CB particles, the cathode active material, were dispersed in the electrolyte to form an active particle-electrolyte suspension. Mechanical shearing was used to help forming uniform dispersion. (This active particle-electrolyte suspension, even with a low salt concentration of 1.0 M, was also quite viscous). RGO or CNT filaments were then dispersed in the active particle-electrolyte suspension to form a quasi-solid electrode material.

Sequence 3 (S3): First, a desired amount of RGO or CNT filaments was dispersed in the liquid solvent mixture (PC+DOL) containing no lithium salt dissolved therein. Mechanical shearing was used to help forming uniform suspension of conducting filaments in the solvent. The $LiBF_4$ salt, PEO, and S/CB particles were then added into the suspension, allowing $LiBF_4$ salt to get dissolved in the solvent mixture of the suspension to form an electrolyte having a salt concentration of 1.0 M, 2.5 M, and 3.5 M, respectively. Concurrently or subsequently, S/CB particles were dispersed in the electrolyte to form a deformable quasi-solid electrode material, which is composed of active material particles and conducting filaments dispersed in a quasi-solid electrolyte (not a liquid electrolyte and not a solid electrolyte). In this quasi-solid electrode material, the conducting filaments percolate to form a 3D network of electron-conducting pathways. This 3D conducting network is maintained when the electrode material is shaped into an electrode of a battery.

The electrical conductivity of the electrode was measured using a four-point probe method. The results are summarized in FIG. 5(A) and FIG. 5(B). These data indicate that typically percolation of conductive filaments (CNFs or RGO) to form a 3D network of electron-conducting paths does not occur until the volume fraction of the conductive filaments exceeds 10-12%, except for those electrodes made by following Sequence 3 (S3). In other words, the step of dispersing conductive filaments in a liquid solvent must be conducted before the lithium salt, sodium salt, or the ion-conducting polymer is dissolved in the liquid solvent and before active material particles are dispersed in the solvent. Such a sequence also enables the percolation threshold to be as low as 0.3%-2.0%, making it possible to produce a conductive electrode by using a minimal amount of conductive additive and, hence, a higher proportion of active material (and higher energy density). These observations were also found to be true of all types of the electrodes containing active material particles, conductive filaments, and electrolytes thus far investigated. This is a critically important and unexpected process requirement for the preparation of high-performing alkali metal batteries having both high energy density and high power density.

A quasi-solid cathode, a porous separator, and a quasi-solid anode (prepared in a similar manner, but having artificial graphite particles as the anode active material) were then assembled together to form a unit cell, which was then encased in a protective housing (a laminated aluminum-plastic pouch), having two terminals protruding out, to make a battery. Batteries containing a liquid or polymer gel electrolyte (1 M) and quasi-solid electrolytes (2.5 M and 3.5 M) were fabricated and tested.

For comparison purposes, slurry coating and drying procedures were conducted to produce conventional electrodes. One anode and one cathode, and a separator disposed between the two electrodes, were then assembled and encased in an Al-plastic laminated packaging envelop, followed by liquid electrolyte injection to form a prior art lithium battery cell. Battery testing results are summarized in Example 18.

Example 9: Electrochemical Deposition of S on Various Webs or Paper Structures for Li—S and Na—S Batteries The electrochemical deposition may be conducted before the cathode active material is incorporated into an alkali metal-sulfur battery cell (Li—S or Na—S cell). In this approach, the anode, the electrolyte, and a layer of graphene sheets aggregated together (serving as a cathode layer) are positioned in an electrochemical deposition chamber. The needed apparatus is similar to an electro-plating system, which is well-known in the art.

In a typical procedure, a metal polysulfide ($M_xS_y$) is dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution is then poured into a chamber or reactor under a dry and controlled atmosphere condition (e.g. He or Nitrogen gas). A metal foil can be used as the anode and a layer of the porous graphene structure as the cathode; both being immersed in the electrolyte solution. This configuration constitutes an electrochemical deposition system. The step of electrochemically depositing nano-scaled sulfur particles or coating on surfaces of graphene sheets is conducted at a current density preferably in the range of 1 mA/g to 10 A/g, based on the layer weight of the porous graphene structure.

The chemical reactions that occur in this reactor may be represented by the following equation: $M_xS_y \rightarrow M_xS_{y-z} + zS$ (typically z=1-4). Quite surprisingly, the precipitated S is preferentially nucleated and grown on massive graphene surfaces to form nano-scaled coating or nano particles. The coating thickness or particle diameter and the amount of S coating/particles may be controlled by the specific surface area, electro-chemical reaction current density, temperature and time. In general, a lower current density and lower reaction temperature lead to a more uniform distribution of S and the reactions are easier to control. A longer reaction time leads to a larger amount of S deposited on graphene surfaces and the reaction is ceased when the sulfur source is consumed or when a desired amount of S is deposited. These S-coated paper or web structures were then pulverized into fine particles for use as the cathode active material of a Li—S or Na—S cell.

Example 10: Chemical Reaction-Induced Deposition of Sulfur Particles on Isolated Graphene Sheets Prior to Cathode Layer Preparation A prior art chemical deposition method is herein utilized to prepare S-graphene composites from isolated graphene oxide sheets (i.e. these GO sheets were not packed into an integral structure of porous graphene prior to chemical deposition of S on surfaces of GO sheets). The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a graphene oxide-sulfur (GO-S) composite was prepared by a chemical deposition method in an aqueous solution. First, 180 mg of graphite oxide was suspended in 180 ml ultrapure water and then sonicated at 50° C. for 5 hours to form a stable graphene oxide (GO) dispersion. Subsequently, the $Na_2S_x$ solution was added to the above-prepared GO dispersions in the presence of 5 wt % surfactant cetyl trimethyl-ammonium bromide (CTAB), the as-prepared $GO/Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-}+2H^+\rightarrow(x-1)S+H_2S$.

Example 11: Redox Chemical Reaction-Induced Deposition of Sulfur Particles on Isolated Graphene Sheets and Activated Carbon (AC) Particles Prior to Cathode Layer Preparation In this chemical reaction-based deposition process, sodium thiosulfate ($Na_2S_2O_3$) was used as a sulfur source and HCl as a reactant. A GO-water or activated carbon-water suspension was prepared and then the two reactants (HCl and $Na_2S_2O_3$) were poured into this suspension. The reaction was allowed to proceed at 25-75° C. for 1-3 hours, leading to the precipitation of S particles deposited on surfaces of GO sheets or into pores of AC particles. The reaction may be represented by the following reaction:
$2HCl+Na_2S_2O_3\rightarrow 2NaCl+S\downarrow+SO_2\uparrow+H_2O$.

Example 12: Preparation of S/GO Nanocomposites Via Solution Deposition

GO sheets and S were mixed and dispersed in a solvent ($CS_2$) to form a suspension. After thorough stirring, the solvent was evaporated to yield a solid nanocomposite, which was then ground to yield nanocomposite powder. The primary sulfur particles in these nanocomposite particles have an average diameter of approximately 40-50 nm.

Example 13: Conductive Web of Filaments from Electro-Spun PAA Fibrils as a Supporting Layer for the Anode Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain carbonized nanofibers with an average fibril diameter of 67 nm. Such a web can be used as a conductive substrate for an anode active material. We observe that the implementation of a network of conductive nano-filaments at the anode of a Li—S cell can effectively suppress the initiation and growth of lithium dendrites that otherwise could lead to internal shorting.

Example 14: Preparation of Pre-Sodiated Graphene Fluoride Sheets as an Anode Active Material of a Sodium-Sulfur Battery Several processes have been used by us to produce graphene fluoride (GF), but only one process is herein described as an example. In a typical procedure, highly exfoliated graphite (HEG) was prepared from intercalated compound $C_2F\cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. The graphene fluoride powder was mixed with sodium chips in a liquid electrolyte, allowing for pre-sodiation to occur before or after injection into pores of an anode current collector.

Example 15: Graphene-Enhanced Nano Silicon as an Anode Active Material of a Lithium-Ion Sulfur Battery Graphene-wrapped Si particles were available from Angstron Energy Co., Dayton, Ohio). Quasi-solid anode electrodes were prepared by dispersing pristine graphene sheets (as conductive filaments) in a PC-DOL (50/50 ratio) mixture, followed by dispersing graphene-wrapped Si particles (anode active material), and by dissolving 3.5 M of lithium hexafluorophosphate ($LiPF_6$) in the mixture solvent at 60° C. Then, DOL was removed to obtain a quasi-solid electrolyte containing about 5.0 M of $LiPF_6$ in PC. This brings $LiPF_6$ in a supersaturated state since the maximum solubility of $LiPF_6$ in PC is known to be lower than 3.0 M at room temperature.

Example 16: Graphene-Enhanced Tin Oxide Particulates as an Anode Active Material Tin oxide ($SnO_2$) nano particles were obtained by the controlled hydrolysis of $SnCl_4\cdot 5H_2O$ with NaOH using the following procedure: SnCl$_4$·5H$_2$O (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 min. Subsequently, the resulting hydrosol was reacted with the GO dispersion for 3 hours. To this mixed solution, few drops of 0.1 M of H$_2$SO$_4$ were added to flocculate the product. The precipitated solid was collected by centrifugation, washed with water and ethanol, and dried in vacuum. The dried product was heat-treated at 400° C. for 2 h under Ar atmosphere and was used as an anode active material.

Example 17: Preparation and Electrochemical Testing of Various Battery Cells

For most of the anode and cathode active materials investigated, we prepared lithium-ion cells or lithium metal cells using both the presently invented method and the conventional method.

With the conventional method, a typical anode composition includes 85 wt. % active material (e.g., Si-coated graphene sheets), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. With the instant method, typically no binder resin is needed or used, saving 8% weight (reduced amount of non-active materials). Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. As an example, the cell is then injected with 1M LiPF$_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

In the presently invented process, preferably a quasi-solid polymer anode, a porous separator, and a quasi-solid polymer cathode are assembled in a protective housing. The pouch was then sealed.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

Example 18: Representative Testing Results

Figure 6A:
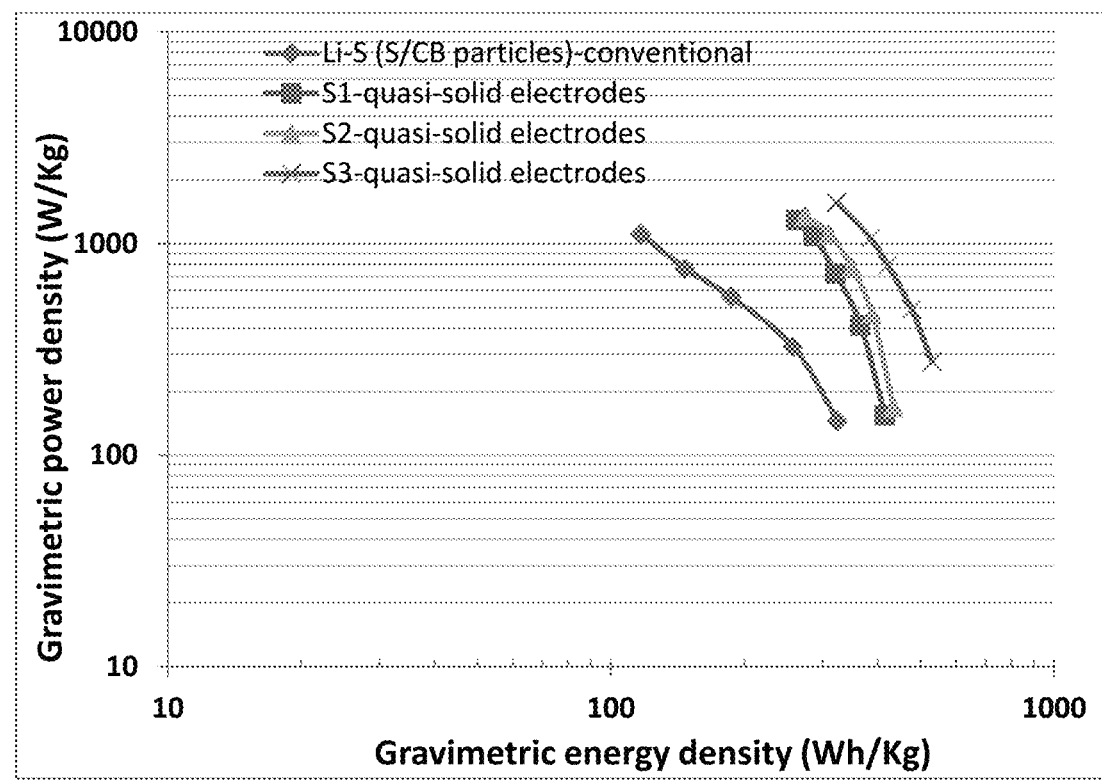
FIG. 6(A) Ragone plots (gravimetric power density vs. energy density) of Li—S cells containing S/CB composite particles as the cathode active materials and carbon nanofibers as conductive filaments. Three of the 4 data curves are for the cells prepared according to an embodiment of instant invention and the remaining one by the conventional slurry coating of electrodes (roll-coating).
Figure 6B:
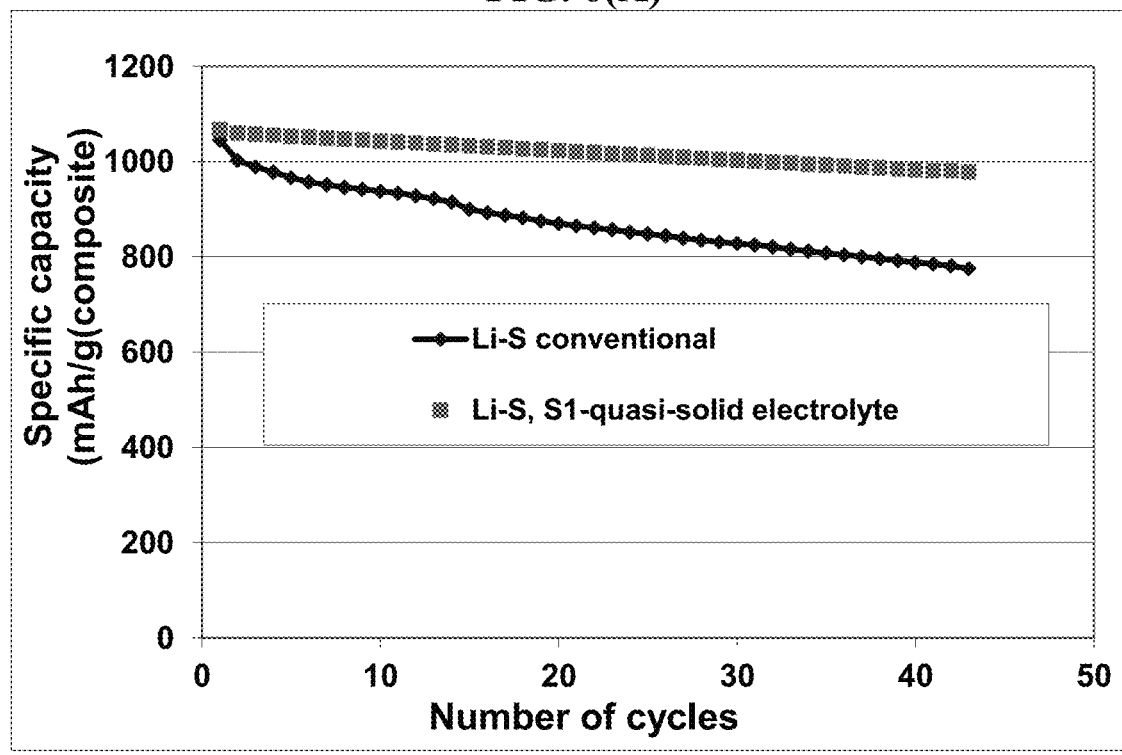
FIG. 6(B) Cycling behaviors of a conventional Li—S cell and a Li—S cell containing a quasi-solid electrolyte and a quasi-solid cathode.

For each sample, several current densities (representing charge/discharge rates) were imposed to determine the electrochemical responses, allowing for calculations of energy density and power density values required of the construction of a Ragone plot (power density vs. energy density). Shown in FIG. 6(A) are Ragone plots (gravimetric power density vs. energy density) of lithium-sulfur cells containing Li foil as the anode active material and carbon black-sulfur composite particles as the cathode active materials. Three of the 4 data curves are for the cells prepared according to an embodiment of instant invention (with Sequence S1, S2, and S3, respectively) and the remaining one by the conventional slurry coating of electrodes (roll-coating). Several significant observations can be made from these data:

The gravimetric energy densities and power densities of the lithium-ion battery cells prepared by the presently invented method are significantly higher than those of their counterparts prepared via the conventional roll-coating method (denoted as "conventional"). A change from a cathode thickness of 150 μm (coated on a flat solid Al foil) to a thickness of 525 μm having a quasi-solid polymer electrolyte results in a gravimetric energy density increase from 325 Wh/kg to 415 Wh/kg (S1), 430 Wh/kg (S2), and 530 Wh/kg (S3), respectively. Also surprisingly, the battery containing presently invented quasi-solid electrodes having a 3D network of electron-conducting pathways (due to percolation of conductive filaments) deliver a significantly higher energy density (FIG. 6(A)) and more stable cycling behavior (FIG. 6(B)).

These huge differences cannot be simply ascribed to the increases in the electrode thickness and the mass loading. The differences are likely due to the significantly higher active material mass loading (not just mass loading) and the higher conductivity associated with the presently invented cells, reduced proportion of overhead (non-active) components relative to the active material weight/volume, and surprisingly better utilization of the electrode active material (most, if not all, of S contributing to the lithium ion storage capacity due to higher conductivity and no dry pockets or ineffective spots in the electrode, particularly under high charge/discharge rate conditions).

Figure 7A:
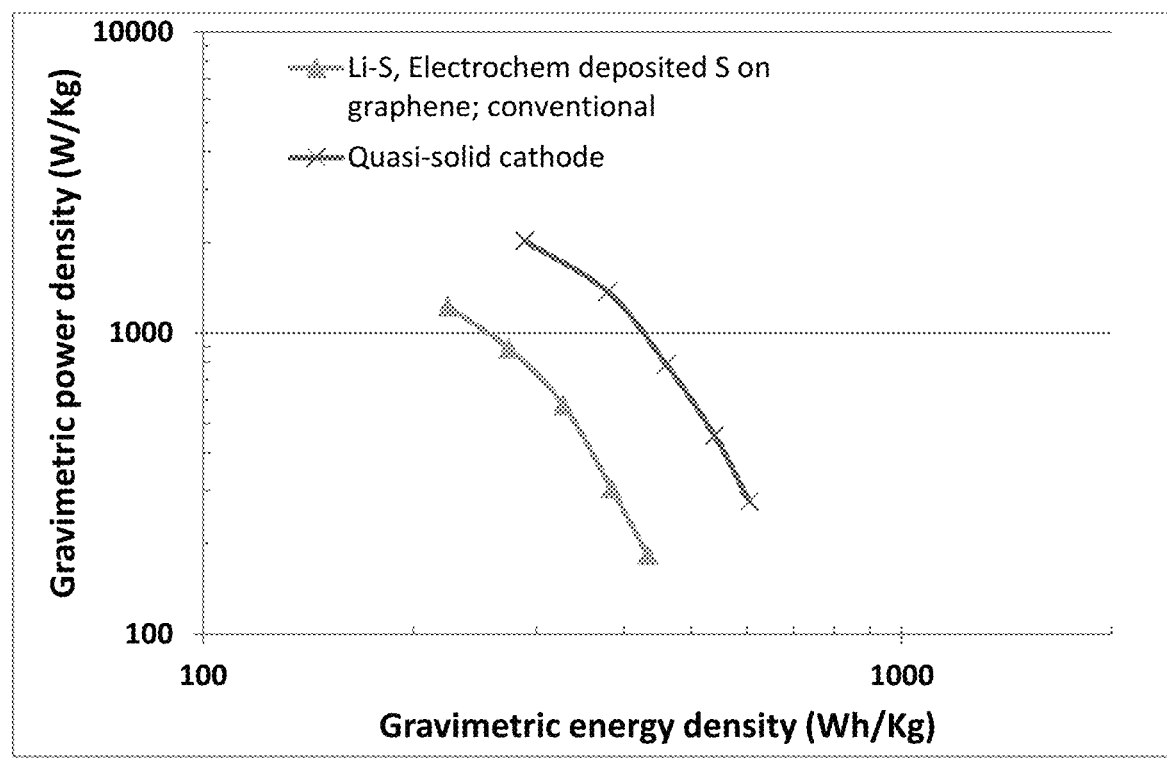
FIG. 7(A) Ragone plots (gravimetric power density vs. energy density) of Li—S cells containing graphene-supported S particles (S electrochemically deposited on graphene surfaces) as the cathode active materials and RGO as conductive filaments. Three of the 4 data curves are for the cells prepared according to an embodiment of instant invention and the remaining one by the conventional slurry coating of electrodes (roll-coating).

FIG. 7(A) shows the Ragone plots (gravimetric power density vs. gravimetric energy density) of two cells, both containing graphene-supported S particles as the cathode active material. The experimental data were obtained from the Li—S battery cells that were prepared by the presently invented method and those by the conventional slurry coating of electrodes.

Figure 7B:
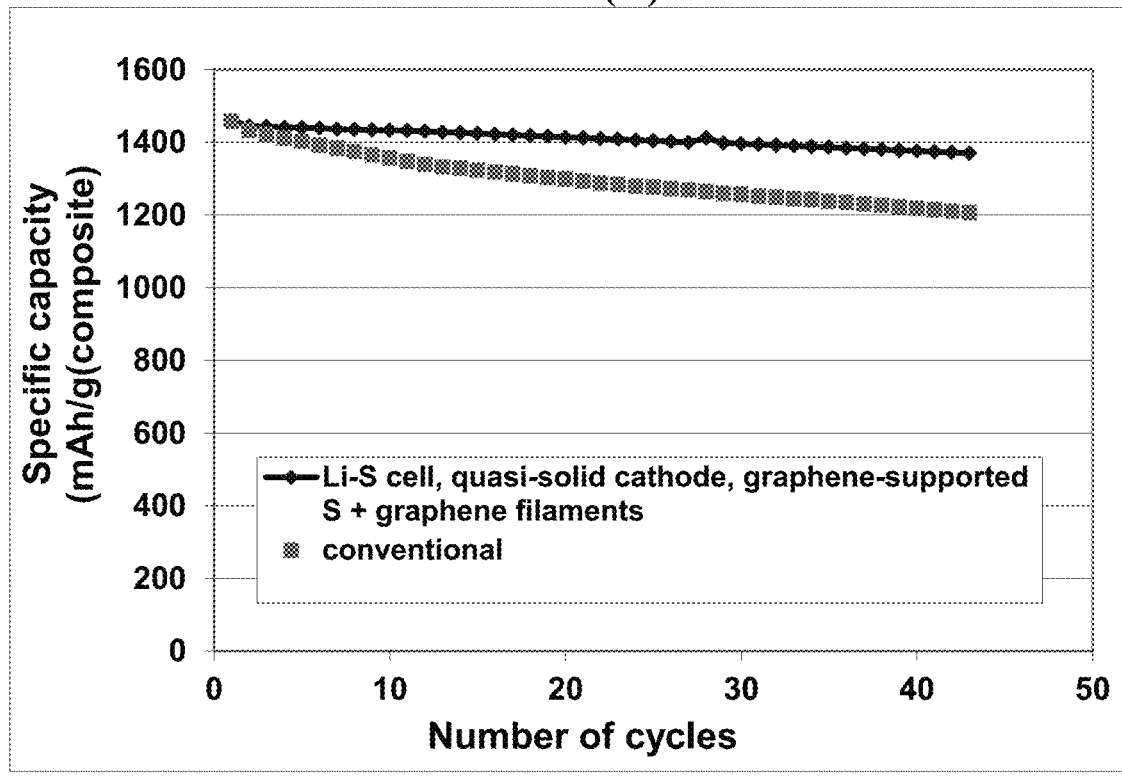
FIG. 7(B) Cycling behaviors of a conventional Li—S cell and a Li—S cell containing a quasi-solid electrolyte and a quasi-solid cathode.

These data indicate that the gravimetric energy densities and power densities of the battery cells prepared by the presently invented method are significantly higher than those of their counterparts prepared via the conventional method. Again, the differences are huge. The conventionally made cells exhibit a gravimetric energy density of 433 Wh/kg, but the presently invented cells deliver an energy density of 605 Wh/kg (S3), respectively. The power density, as high as 2,021 W/kg, is also unprecedented for lithium-sulfur batteries. The invented cell also delivers a much more stable charge/discharge cycling behavior, as demonstrated in FIG. 7(B)).

These energy density and power density differences are mainly due to the high active material mass loading (>25 mg/cm$^2$ in the anode and >45 mg/cm$^2$ in the cathode) and high electrode conductivity associated with the presently invented cells, reduced proportion of overhead (non-active) components relative to the active material weight/volume, and the ability of the inventive method to better utilize the active material (all particles being accessible to liquid electrolyte and fast ion and electron kinetics).

Figure 8:
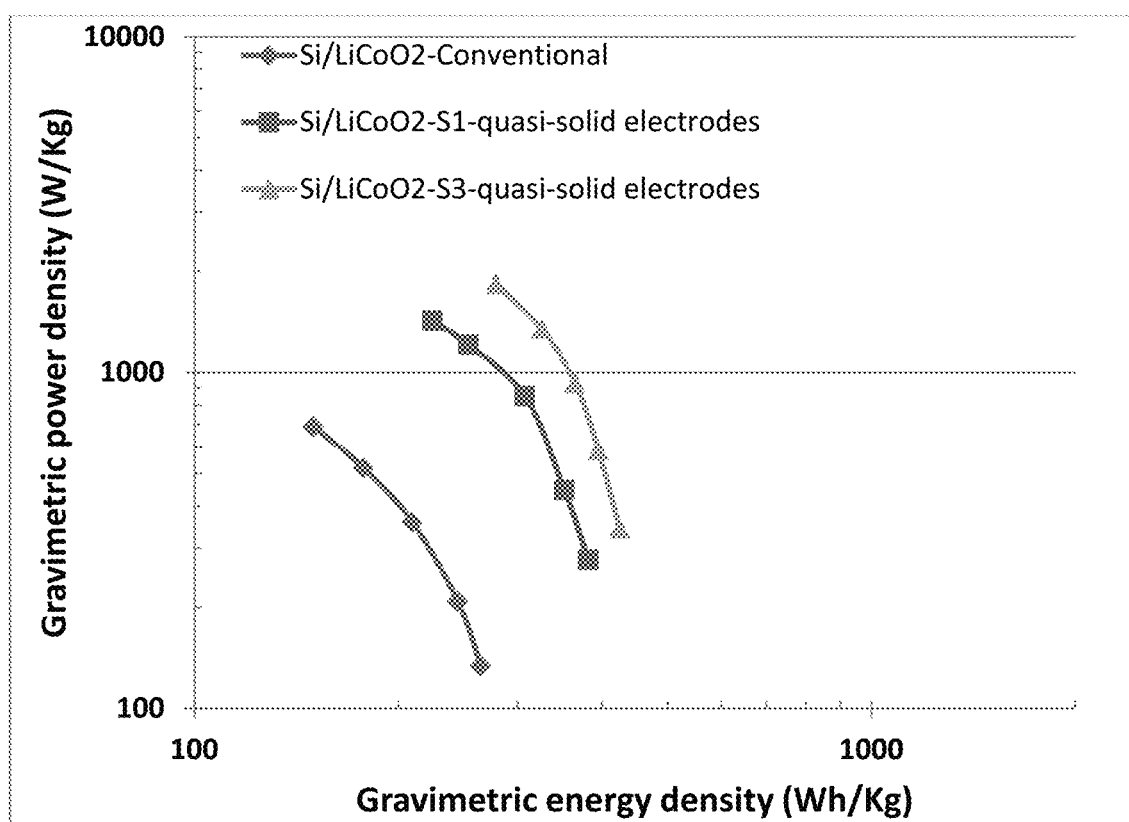
FIG. 8 Ragone plots of cells with Si nano particle anode, lithium cobalt oxide ($LiCoO_2$) cathode, and quasi solid electrolyte (S1, S3) as compared to conventional electrolyte FIG. 9 Ragone plots of a sodium ion capacitor (SIC) with quasi solid electrolyte as compared to an SIC with conventional electrolyte.
Figure 9:
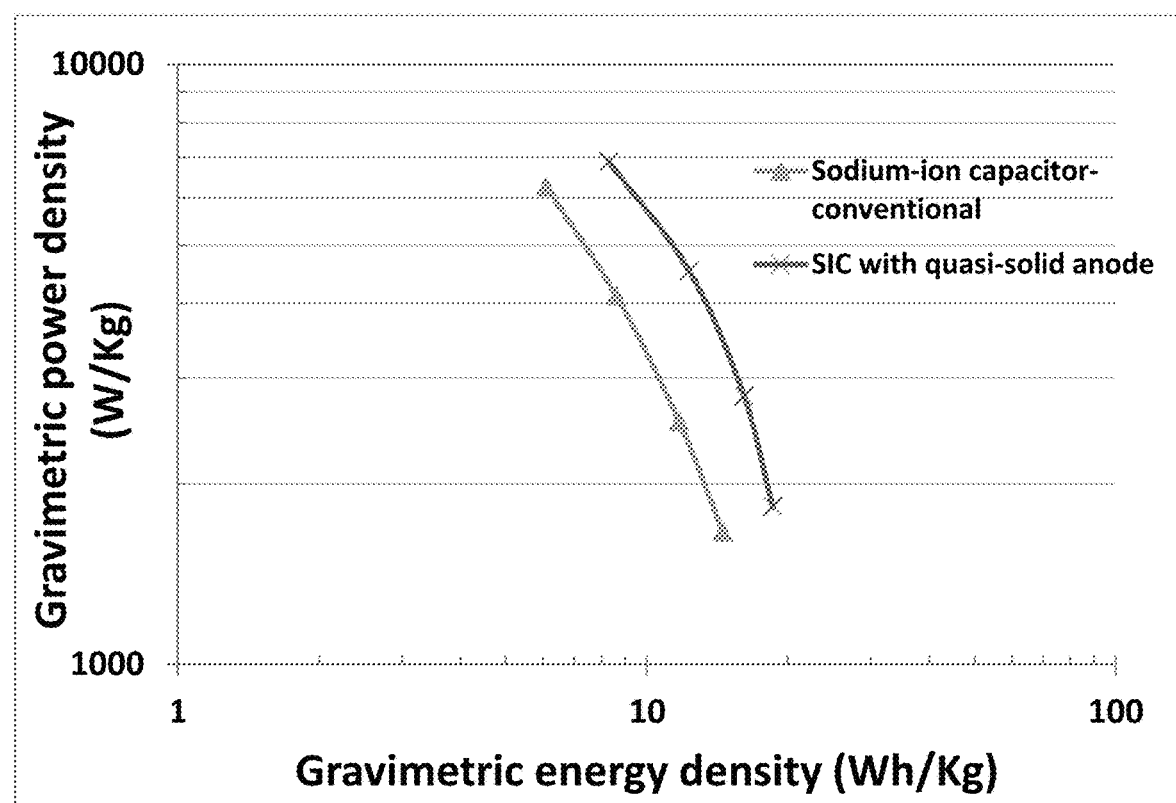

FIG. 8 shows the Ragone plots (gravimetric power density vs. gravimetric energy density) of cells with Si nano particle anode and lithium cobalt oxide (LiCoO$_2$) cathode with quasi solid electrolyte (S1, S3) as compared to a cell conventional electrolyte. FIG. 9 shows the Ragone plots (gravimetric power density vs. gravimetric energy density) of a sodium ion capacitor (SIC) with quasi solid electrolyte as compared to and SIC with conventional electrolyte.

It is of significance to point out that reporting the energy and power densities per weight of active material alone on a Ragone plot, as done by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional battery production processes. The present invention overcomes this long-standing, most serious problem in the art of lithium batteries.

In a commercial lithium-ion batteries having an electrode thickness of 100-200 μm, the weight proportion of the anode active material (e.g. graphite or carbon) in a lithium-ion battery is typically from 12% to 17%, and that of the cathode active material (for inorganic material, such as $LiMn_2O_4$) from 22% to 41%, or from 10% to 15% for organic or polymeric. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<100 μm, and mostly <<50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial batteries. Thus, one must be very careful when it comes to read and interpret the performance data of batteries reported in the scientific papers and patent applications.

We claim:

1. An alkali metal-sulfur cell comprising:
   (a) a quasi-solid cathode containing from 30% to 95% by volume of a sulfur-containing cathode active material, from 5% to 40% by volume of a first electrolyte containing an alkali salt dissolved in a solvent and no ion-conducting polymer dissolved or dispersed in the solvent, and from 0.01% to 30% by volume of a conductive additive, wherein said sulfur-containing cathode active material contains sulfur, a metal-sulfur compound, a sulfur-carbon composite, a sulfur-graphene composite, a sulfur-graphite composite, an organic sulfur compound, a sulfur-polymer composite, or a combination thereof, and wherein said conductive additive, containing conductive filaments, forms a 3D network of electron-conducting pathways such that the quasi-solid cathode has an electrical conductivity from $10^{-6}$ S/cm to 300 S/cm, wherein said first electrolyte is in a supersaturated state;
   (b) an anode; and
   (c) an ion-conducting membrane or porous separator disposed between the anode and the quasi-solid cathode.

2. The alkali metal-sulfur cell of claim 1, wherein said anode contains a quasi-solid anode containing from 1.0% to about 95% by volume of an anode active material, from 5% to 40% by volume of a second electrolyte containing an alkali salt dissolved in a solvent, and from 0.01% to about 30% by volume of a conductive additive wherein said conductive additive, containing conductive filaments, forms a 3D network of electron-conducting pathways such that the quasi-solid electrode has an electrical conductivity from about $10^{-6}$ S/cm to about 300 S/cm.

3. The alkali metal-sulfur cell of claim 2, wherein said first electrolyte or second electrolyte is in a supersaturated state.

4. The alkali metal-sulfur cell of claim 2, wherein said first electrolyte or second electrolyte contains a solvent selected from water, an organic solvent, an ionic liquid, or a mixture of an organic solvent and an ionic liquid.

5. The alkali metal-sulfur cell of claim 2, wherein said alkali metal-sulfur cell is a sodium-sulfur cell or sodium-ion sulfur cell and said anode contains an anode active material selected from the group consisting of:
   a) particles, foil, or thin film of sodium metal or a sodium metal alloy;
   b) natural graphite particles, artificial graphite particles, meso-carbon microbeads (MCMB), carbon particles, needle coke, carbon nanotubes, carbon nanofibers, carbon fibers, and graphite fibers;
   c) sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
   d) sodium-containing alloys or intermetallic compounds of Si, Ge, Sn, Pb, Sb, Bi, Zn, Al, Ti, Co, Ni, Mn, Cd, and their mixtures;
   e) sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
   f) sodium salts;
   g) graphene sheets pre-loaded with sodium ions; and combinations thereof.

6. The alkali metal-sulfur cell of claim 2, wherein said anode active material constitutes an electrode active material mass loading greater than 20 mg/cm².

7. The alkali metal-sulfur cell of claim 1, wherein said conductive filaments are selected from carbon fibers, graphite fibers, carbon nanofibers, graphite nanofibers, carbon nanotubes, needle coke, carbon whiskers, conductive polymer fibers, conductive material-coated fibers, metal nanowires, metal fibers, metal wires, graphene sheets, expanded graphite platelets, a combination thereof, or a combination thereof with non-filamentary conductive particles.

8. The alkali metal-sulfur cell of claim 1, wherein said cathode has an electrical conductivity from $10^{-3}$ S/cm to 10 S/cm.

9. The alkali metal-sulfur cell of claim 1, wherein said quasi-solid cathode contains from 0.1% to 20% by volume of a conductive additive.

10. The alkali metal-sulfur cell of claim 1, wherein said quasi-solid cathode contains from 1% to 10% by volume of a conductive additive.

11. The alkali metal-sulfur cell of claim 1, wherein the quantity of the cathode active material is from 40% to 90% by volume of the cathode.

12. The alkali metal-sulfur cell of claim 1, wherein the quantity of the cathode active material is from 50% to 85% by volume of the cathode.

13. The alkali metal-sulfur cell of claim 1, wherein said solvent is selected from water, an organic solvent, an ionic liquid, or a mixture of an organic solvent and an ionic liquid.

14. The alkali metal-sulfur cell of claim 1, wherein said anode contains an anode active material selected from the group consisting of:
- (a) particles, thin film, or foil of lithium metal or a lithium metal alloy;
- (b) natural graphite particles, artificial graphite particles, meso-carbon microbeads (MCMB), carbon particles, needle coke, carbon nanotubes, carbon nanofibers, carbon fibers, and graphite fibers;
- (c) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd);
- (d) alloys or intermetallic compounds of Si, Ge, Sn, Pb, Sb, Bi, Zn, Al, or Cd with other elements, wherein said alloys or compounds are stoichiometric or non-stoichiometric;
- (e) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites;
- (f) pre-lithiated versions thereof;
- (g) pre-lithiated graphene sheets; and
combinations thereof.

15. The alkali metal-sulfur cell of claim 14, wherein said pre-lithiated graphene sheets are selected from pre-lithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

16. The alkali metal-sulfur cell of claim 1, wherein said alkali metal cell is a sodium metal-sulfur cell or sodium-ion sulfur cell and said anode contains an anode active material containing sodium metal or an alkali intercalation compound selected from petroleum coke, amorphous carbon, activated carbon, hard carbon, soft carbon, templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

17. The alkali metal-sulfur cell of claim 1, wherein said cathode active material is supported by a functional material or nano-structured material selected from the group consisting of:
- A) a nano-structured or porous disordered carbon material selected from particles of a soft carbon, hard carbon, polymeric carbon or carbonized resin, meso-phase carbon, coke, carbonized pitch, carbon black, activated carbon, nano-cellular carbon foam or partially graphitized carbon;
- B) a nano graphene platelet selected from a single-layer graphene sheet or multi-layer graphene platelet;
- C) a carbon nanotube selected from a single-walled carbon nanotube or multi-walled carbon nanotube;
- D) a carbon nanofiber, nanowire, metal oxide nanowire or fiber, conductive polymer nanofiber, or a combination thereof;
- E) a carbonyl-containing organic or polymeric molecule;
- F) a functional material containing a carbonyl, carboxylic, or amine group to reversibly capture sulfur;
and combinations thereof.

18. The alkali metal-sulfur battery of claim 1, wherein said first electrolyte contains an organic solvent selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, and combinations thereof.

19. The alkali metal-sulfur battery of claim 1, wherein said first electrolyte contains an alkali metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), Lithium bis(oxalato)borate (LiBOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF3(CF_2CF_3)_3$), lithium bisperfluoroethysulfonylimide (LiBETI), sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

20. The alkali metal-sulfur battery of claim 1, wherein said first electrolyte contains an ionic liquid solvent selected from a room temperature ionic liquid having a cation selected from tetra-alkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof.

21. The alkali metal-sulfur battery of claim 20, wherein said ionic liquid solvent is selected from a room temperature ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

22. An alkali metal-sulfur cell comprising:
- A) a quasi-solid anode containing from 1.0% to 95% by volume of an anode active material, from 5% to 40% by volume of an electrolyte containing an alkali salt dissolved in a solvent and no ion-conducting polymer dissolved or dispersed in the solvent, and from 0.01% to 30% by volume of a conductive additive wherein said conductive additive, containing conductive filaments, forms a 3D network of electron-conducting pathways such that the quasi-solid anode has an electrical conductivity from about $10^{-6}$ S/cm to about 300 S/cm, wherein said electrolyte is in a supersaturated state;
- B) a cathode containing a cathode active material selected from sulfur, a metal-sulfur compound, a sulfur-carbon composite, a sulfur-graphene composite, a sulfur-graphite composite, an organic sulfur compound, or a sulfur-polymer composite; and C) an ion-conducting membrane or porous separator disposed between the quasi-solid anode and the cathode.

23. The alkali metal-sulfur cell of claim 22, wherein said conductive filaments are selected from carbon fibers, graphite fibers, carbon nanofibers, graphite nanofibers, carbon nanotubes, needle coke, carbon whiskers, conductive polymer fibers, conductive material-coated fibers, metal nanowires, metal fibers, metal wires, graphene sheets, expanded graphite platelets, a combination thereof, or a combination thereof with non-filamentary conductive particles.

24. An alkali metal-sulfur cell comprising:
(a) a quasi-solid cathode containing from 30% to 95% by volume of a sulfur-containing cathode active material, from 5% to 40% by volume of a first electrolyte containing an alkali salt dissolved in a solvent and no ion-conducting polymer dissolved or dispersed in the solvent, and from 0.01% to 30% by volume of a conductive additive, wherein said sulfur-containing cathode active material contains sulfur, a metal-sulfur compound, a sulfur-carbon composite, a sulfur-graphene composite, a sulfur-graphite composite, an organic sulfur compound, a sulfur-polymer composite, or a combination thereof, and wherein said conductive additive, containing conductive filaments, forms a 3D network of electron-conducting pathways such that the quasi-solid cathode has an electrical conductivity from $10^{-6}$ S/cm to 300 S/cm;
(b) an anode; and
(c) an ion-conducting membrane or porous separator disposed between the anode and the quasi-solid cathode;
wherein said cathode active material constitutes an electrode active material mass loading greater than 15 mg/cm$^2$.

25. The alkali metal-sulfur cell of claim 24, wherein said cathode active material constitutes an electrode active material mass loading greater than 30 mg/cm$^2$.

* * * * *